(12) United States Patent
O'Neal

(10) Patent No.: US 6,411,685 B1
(45) Date of Patent: Jun. 25, 2002

(54) SYSTEM AND METHOD FOR PROVIDING UNIFIED MESSAGING TO A USER WITH A THIN WEB BROWSER

(75) Inventor: Stephen C. O'Neal, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/240,367

(22) Filed: Jan. 29, 1999

(51) Int. Cl.$^7$ ................................................. H04M 1/64
(52) U.S. Cl. ................. 379/88.14; 379/88.22; 379/93.24; 379/100.08
(58) Field of Search ............................ 379/67.1, 88.13, 379/88.14, 88.16, 88.17, 88.19, 88.2, 88.21, 88.22, 88.23, 88.25, 93.01, 93.15, 93.24, 100.01, 100.08, 100.13; 709/203, 217, 246; 358/402, 403, 407

(56) References Cited

U.S. PATENT DOCUMENTS

| | | | | |
|---|---|---|---|---|
| 5,497,373 A | * | 3/1996 | Hulen et al. | 379/89 |
| 5,557,659 A | * | 9/1996 | Hyde-Thomson | 379/88 |
| 5,675,507 A | * | 10/1997 | Bobo, II | 364/514 |
| 5,812,865 A | * | 9/1998 | Theimer et al. | 379/88 |
| 5,832,221 A | * | 11/1998 | Jones | 379/88 |
| 5,838,768 A | * | 11/1998 | Sumar et al. | 379/89 |
| 5,870,454 A | * | 2/1999 | Dahlen | 379/88.14 |
| 5,943,399 A | * | 8/1999 | Bannister et al. | 379/88.17 |
| 5,963,618 A | * | 10/1999 | Porter | 379/88.17 |
| 6,028,679 A | * | 2/2000 | Murphy | 358/407 |
| 6,072,862 A | * | 6/2000 | Srinivasan | 379/100.08 |
| 6,104,789 A | * | 8/2000 | Lund | 379/93.23 |
| 6,148,329 A | * | 11/2000 | Meyer | 709/206 |
| 6,157,706 A | * | 12/2000 | Rachelson | 379/100.08 |
| 6,230,189 B1 | * | 5/2001 | Sato et al. | 709/206 |
| 6,233,318 B1 | * | 5/2001 | Picard et al. | 379/88.17 |
| 6,278,532 B1 | * | 8/2001 | Heimendinger et al. | 358/442 |

FOREIGN PATENT DOCUMENTS

EP          0854655         *  7/1998

* cited by examiner

*Primary Examiner*—Scott L. Weaver
(74) *Attorney, Agent, or Firm*—Senniger, Powers, Leavitt & Roedel

(57) ABSTRACT

A unified messaging system. A server node with a telephony interface to interface with the public switch telephone network and a web interface providing an interface to a wide area network receives messages of a plurality of type via these interfaces. The messages are stored in a database and provided by the server node to a user node executing a web browser. The server node provides message conversion so that a user at the user node can retrieve messages of the different media types, respond to those messages, forward messages, and send messages of different message types across a plurality of media originating from the user node over the wide area network.

15 Claims, 23 Drawing Sheets

FIG. 7

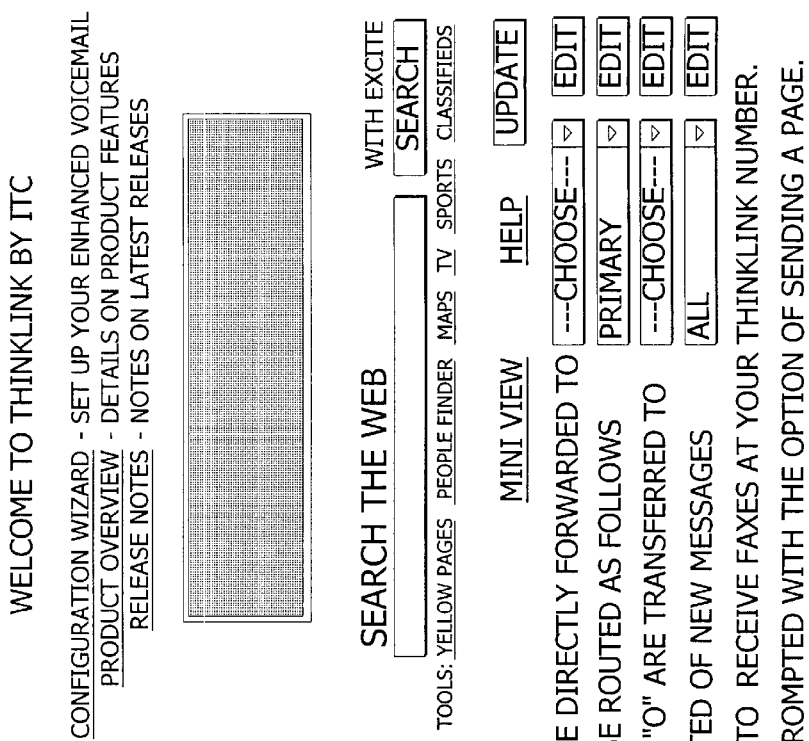

THINKLINK BY ITC

HI THOMAS !
MESSAGE CENTRAL

2 NEW EMAIL
0 NEW FAXMAIL
0 NEW VOICEMAIL

COMPOSE      OPTIONS
FOLDERS      MY ACCOUNT
ADDRESSES    HELP DESK
             LOG OUT

WELCOME TO THINKLINK BY ITC

CONFIGURATION WIZARD - SET UP YOUR ENHANCED VOICEMAIL
PRODUCT OVERVIEW - DETAILS ON PRODUCT FEATURES
RELEASE NOTES - NOTES ON LATEST RELEASES

SEARCH THE WEB                    WITH EXCITE
[_____]                 [SEARCH]
             MINI VIEW        HELP
TOOLS: YELLOW PAGES  PEOPLE FINDER  MAPS  TV  SPORTS  CLASSIFIEDS
                                                      [UPDATE]

COMMUNICATIONS DASHBOARD

CALL FORWARD       ON○ OFF⊙  YOUR CALLS WILL BE DIRECTLY FORWARDED TO  [---CHOOSE---▷]  [EDIT]
FOLLOW ME SERVICE  ON○ OFF⊙  YOUR CALLS WILL BE ROUTED AS FOLLOWS      [PRIMARY     ▷]  [EDIT]
ALTERNATE NUMBER   ON○ OFF⊙  CALLERS PRESSING "0" ARE TRANSFERRED TO   [---CHOOSE---▷]  [EDIT]
MESSAGE ALERT      ON○ OFF⊙  YOU WILL BE ALERTED OF NEW MESSAGES       [ALL         ▷]  [EDIT]
FAX RECEIVING      ON⊙ OFF○  YOU WILL BE ABLE TO RECEIVE FAXES AT YOUR THINKLINK NUMBER.
PAGING             ON○ OFF⊙  CALLERS WILL BE PROMPTED WITH THE OPTION OF SENDING A PAGE.

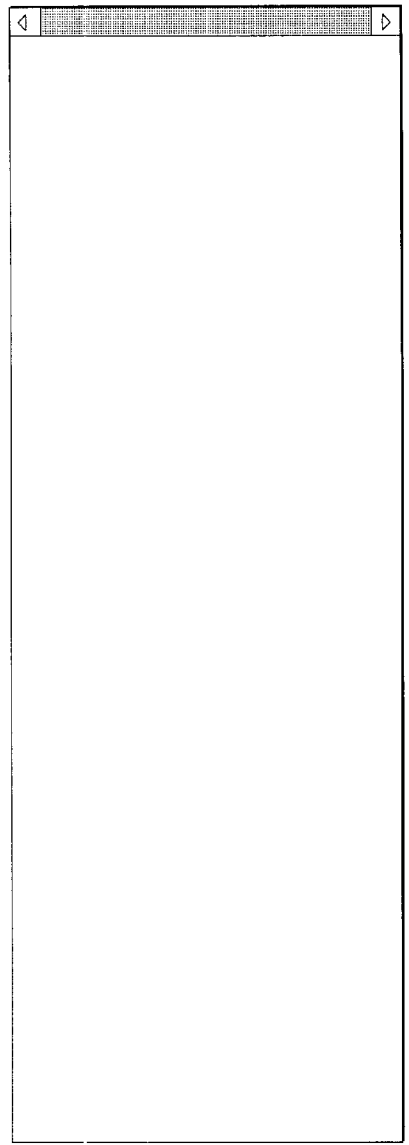

FIG. 9

FOLDERS FOR: COESTER@THINKLINK.COM                                         HELP

| VOICEMAIL | TOTAL | NEW | FAXMAIL | TOTAL | NEW |
|---|---|---|---|---|---|
| INBOX | 10 | 0 | INBOX | 4 | 0 |
| TRASH [EMPTY] | 3 | 0 | TRASH [EMPTY] | 0 | 0 |

| EMAIL | TOTAL | NEW |
|---|---|---|
| INBOX | 17 | 2 |
| SENT ITEMS | 4 | 4 |
| DRAFTS | 0 | 0 |
| TRASH [EMPTY] | 7 | 2 |

CUSTOM EMAIL FOLDERS: [--NO CUSTOM FOLDER--]

[RENAME] [REMOVE]
ONLY EMPTY FOLDERS MAY BE REMOVED.

TYPE FOLDER NAME: [      ] [CREATE NEW FOLDER]

FIG. 12

COMPOSE EMAIL, FAX OR VOICEMAIL

HELP

[SEND] [SAVE DRAFT]    PRIORITY [NORMAL ▽] [CANCEL]

TO: [COESTER@THINKLINK.COM, 408-964-6200]    USE A COMMA BETWEEN ADDRESSES.
TO SEND A FAX: 123-456-7890 (FAX)
OR VOICEMAIL: 123-456-7890 (VOICEMAIL)

SUBJECT: [FWD:TEST2]    [ADDRESS BOOK]

Cc: [408-964-6200 (VOICEMAIL)]    [FOUR11 DIRECTORY]

Bcc: [                    ]

```
FAX SENT PLEASE CHECK FAX MACHINE.
◁                                              ▷
```

◉ PLAIN TEXT  ○ HTML PREVIEW  ☑ SAVE A COPY OF OUTGOING MESSAGE  ☐ USE SIGNATURE

DELIVER TIME: [NOW]    FAX COVER: [NONE ▽] [EDIT] [NEW]
(mm/dd/yyyy hh:mm)

ATTACHMENTS: 1) 'BROWSE' 2) SELECT FILE 3) CLICK 'ATTACH'  ATTACH [FWD FAX 12281815.tif]
NOTE: 3 ATTACHMENTS ALLOWED. 500K MAX PER ATTACHMENT    DELETE
[BROWSE...]

FIG. 13

SENDING MAIL

EMAIL TO: COESTER@THINKLINK.COM
FAX TO: 408-964-6200
VOICEMAIL cc: 408-964-6200

MAIL SENT SUCCESSFULLY

YOUR MAIL (FWD:TEST2) HAS BEEN SENT.

IN THE CACE OF FAX AND VOICEMAIL, YOU WILL RECEIVE AN EMAIL CONFIRMATION SHORTLY.

📄FAX INBOX (1-4 OF 4)

[DELETE] CHECKED MAIL [OPEN] [-CHOOSE FOLDER ▷] <u>HELP</u>

| ! | TYPE | ✓ | SENDER | SUBJECT | [UPDATE ALL] | DATE | | [MOVE] SIZE |
|---|---|---|---|---|---|---|---|---|
| | 📄FAX | ☐ | | | | ▶ JAN 28 | 4:15P | 2 pg |
| | 📄FAX | ☐ | | COVER SHEET | | DEC 28 | 12:00P | 📎 1 pg |
| | 📄FAX | ☐ | | XMAS LETTER | | DEC 28 | 11:58A | 📎 3 pg |
| | 📄FAX | ☐ | 4152526202 | WELCOME FAX | | OCT 12 | 2:27P | 1 pg |

CHECK ALL - CLEAR ALL

FOR SINGLE CHECKED MESSAGE

[REPLY] [FORWARD] [ADD TO ADDRESSES] FAX: [GIF ▷]

VOICE ATTACHMENT [WAV ▷]

<u>EMPTY FAX TRASH</u>

FIG. 15

📄FAX INBOX (1-4 OF 4)

[DELETE] CHECKED MAIL  [OPEN] -CHOOSE FOLDER-▷  [MOVE]   HELP

| ! | TYPE | ✓ | SENDER | SUBJECT | UPDATE ALL | DATE | | SIZE |
|---|------|---|--------|---------|------------|------|---|------|
|   | FAX  | ☐ |        | COVER SHEET ◀ |  | DEC 28 | 12:00P | 📎 1 pg |
|   | FAX  | ☐ |        | TEST2 |  | JAN 28 | 4:15P | 2 pg |
|   | FAX  | ☐ | 4152526202 | WELCOME FAX |  | OCT 12 | 2:27P | 1 pg |
|   | FAX  | ☐ |        | XMAS LETTER |  | DEC 28 | 11:58A | 📎 3 pg |

CHECK ALL - CLEAR ALL

FOR SINGLE CHECKED MESSAGE

[REPLY] [FORWARD] [ADD TO ADDRESSES]       FAX: [GIF ▷]

VOICE ATTACHMENT: [WAV ▷]

EMPTY FAX TRASH

FIG. 16

☒ INBOX (1-7 OF 7)

[DELETE] ✓ CHECKED MAIL [OPEN] -CHOOSE FOLDER- ▷ [MOVE] HELP

UPDATE ALL

| ! | TYPE | | SENDER | SUBJECT | DATE | | SIZE |
|---|---|---|---|---|---|---|---|
| | ✉ | ☐ | <SUPPORT@THINKLINK.COM> | FAX CONFIRMATION | JAN 28 4:16P | ▸ | 1K |
| | ✉ | ☐ | <SUPPORT@THINKLINK.COM> | VOICEMAIL COMFIRMATION | JAN 28 4:16P | | 1K |
| | ✉ | ☐ | "THOMAS COESTER" | FWD:TEST2 | JAN 28 4:15P | 📎 | 56K |
| ▸ | ✉ | ☐ | COLE CHASE | [FWD:YOUR "HAVE A NICE DAY" LAUGH #0940] | JAN 27 6:58A | | 3K |
| | ✉ | ☐ | COLE CHASE | CHASE UPDATE | JAN 18 6:58A | | 2K |
| ▸ | ✉ | ☐ | KELLY REEVES | XMAS LETTER | DEC 28 12:11P | 📎 | 7K |
| | ✉ | ☐ | KELLY REEVES | TEST TEST | DEC 28 12:11P | | 1K |

CHECK ALL - CLEAR ALL
FOR SINGLE CHECKED MESSAGE
[REPLY] [REPLY ALL] [FORWARD] [ADD TO ADDRESSES]

CHECK EXTERNAL EMAIL - EMPTY MAIL TRASH

FIG. 17

READ MESSAGES

[DELETE] [CLOSE]  <PREVIOUS | NEXT>  [OPEN] -CHOOSE FOLDER-▷ [MOVE]

DATE: Thu, 28 Jan 4:16:40 PM  [REPLY] [REPLY ALL] [FORWARD]

FROM: (SUPPORT@THINKLINK.COM)  ADD TO ADDRESS BOOK

SUBJECT: FAX CONFIRMATION

TO: <COESTER@THINKLINK.COM>

FAX SENT TO 408-964-6200 ON 1/28/99 4:15:32 PM WAS SUCCESSFUL.

SYSTEM AND METHOD FOR PROVIDING UNIFIED MESSAGING TO A USER WITH A THIN WEB BROWSER

RELATED APPLICATIONS

The following applications are related and incorporated herein by reference.

| U.S. Application No. | Filing Date | Title |
|---|---|---|
| 09/239,560 | 1/29/99 | INTEGRATED MESSAGE STORAGE AND RETRIEVAL SYSTEM DISTRIBUTED OVER A LARGE GEOGRAPHICAL AREA |
| 09/239,585 | 1/29/99 | CENTRALIZED COMMUNICATION CONTROL CENTER FOR VISUALLY AND AUDIBLY UPDATING COMMUNICATION OPTIONS ASSOCIATED WITH COMMUNICATION SERVICES OF A UNIFIED MESSAGING SYSTEM AND METHODS THEREFOR |
| 09/239,584 | 1/29/99 | COMPUTER-IMPLEMENTED CALL FORWARDING OPTIONS AND METHODS THEREFOR IN A UNIFIED MESSAGING SYSTEM |
| 09/240,893 | 1/29/99 | INTERACTIVE BILLING SYSTEM UTILIZING A THIN WEB CLIENT INTERFACE |
| 09/240,368 | 1/29/99 | SYSTEM AND METHOD TO MANAGE PHONE SOURCED MESSAGES USING A USER MODIFIABLE FIELD ASSOCIATED WITH THE MESSAGE |
| 09/240,434 | 1/29/99 | METHOD AND APPARATUS FOR NETWORK INDEPENDENT INITIATION OF TELEPHONY |
| 09/240,435 | 1/29/99 | APPARATUS AND METHOD FOR DEVICE INDEPENDENT MESSAGING NOTIFICATION |
| 09/240,436 | 1/29/99 | APPARATUS AND METHOD FOR CHANNEL-TRANSPARENT MULTIMEDIA BROADCAST MESSAGING |
| 09/239,589 | 1/29/99 | VOICE ACCESS THROUGH A DATA-CENTRIC NETWORK TO AN INTEGRATED MESSAGE STORAGE AND RETRIEVAL SYSTEM |

BACKGROUND (1) Field of the Invention

The invention relates to a unified messaging system. More specifically, the invention relates to a system which permits a user to review, respond to, or forward multiple media message types from a user node, executing a thin web browser.

(2) Background

There are a number of messaging media types in common use. Among these media types are e-mail, voicemail, and facsimile messaging. In the past, each of these messaging types was typically a stand-alone system without an association to any other messaging type. More recently, there has been some convergence of the messaging types, such that a general purpose computer, for example, with a connection to a network and also possessing a fax modem, could be used to send and receive e-mail, as well as to receive and view faxes. However, these functions are still largely separate within the computer in that they require different dedicated software and in some cases, hardware, to permit the functionality.

Even more recently, virtual assistants, such as Portico™ from General Magic of Sunnyvale, Calif., has attempted to improve access to incoming media type by permitting voicemails and e-mails to be received over either a telephone connection or via an Internet connection. Unfortunately, the functionality of such virtual assistants ends with the initial playback of the voicemail message.

BRIEF SUMMARY OF THE INVENTION

A unified messaging system is disclosed. A server node with a telephony interface to interface with the public switch telephone network and a web interface providing an interface to a wide area network receives messages of a plurality of type via these interfaces. The messages are stored in a file server and provided by the server node to a user node executing a web browser. The server node provides message conversion so that a user at the user node can retrieve messages of the different media types, respond to those messages, forward messages, and send messages of different message types across a plurality of media originating from the user node over the wide area network.

Each user has metadata associated with the user which includes information on user preferences, as well as a listing of messages currently existing for the user. The metadata is stored in a database and message listings are served to the user upon request. The metadata, and correspondingly, the message list, is updated with the arrival of each new message. Incoming phone sourced calls are answered by a telephony system that converts incoming analog, e.g. voice signals, into one or more digital formats. Among the digital formats used are wave format, VOX format, and audio streaming format. These versions of the received message are stored as message bodies in a file server or a streaming server, as the case may be, to permit them to be rapidly sent to a user responsive to a request. Facsimile messages are similarly received by the telephony interface and stored in TIFF format in a file server. The system provides on the fly conversion from TIFF to GIF based on user preference or merely serves the TIFF file to the user.

The system permits messages of different types to be received and viewed or heard by a user having only a thin web browser without dedicated software. Additionally, the different message types may be forwarded to other recipients across the various media types. For example, an e-mail may be sent as: (i) an e-mail; (ii) a voicemail; or (iii) a fax. A voicemail may be forwarded as an e-mail attachment or as a voicemail; a fax may be sent as a fax or an e-mail attachment. This provides a broad range of communication options without necessitating significant user investment in hardware or software.

BRIEF DESCRIPTION OF THE DRAWINGS

FIG. 7 is initial template downloaded to a user node from a server node once a user logs in.

FIG. 8 is the composed template downloading the response to a click on the composed link of the template of FIG. 7.

FIG. 9 is a folders template of one embodiment of the invention.

FIG. 12 is a composed template responsive to actuation of the forward button in FIG. 11.

FIG. 13 is a confirmation template returned by the server node to indicate that the message has been successfully sent.

FIG. 14 is an e-mail listing reflecting the receipt of the forwarded mail and also the fax confirmation.

FIG. 15 is the fax confirmation e-mail opened.

FIG. 16 shows the fax list template with the addition of the forwarded fax.

FIG. 17 shows the same fax listing sorted alphabetically by subject with the subject field modified to reflect the subject of the previously forwarded fax.

DETAILED DESCRIPTION

Definition of Terms

Figure 1:
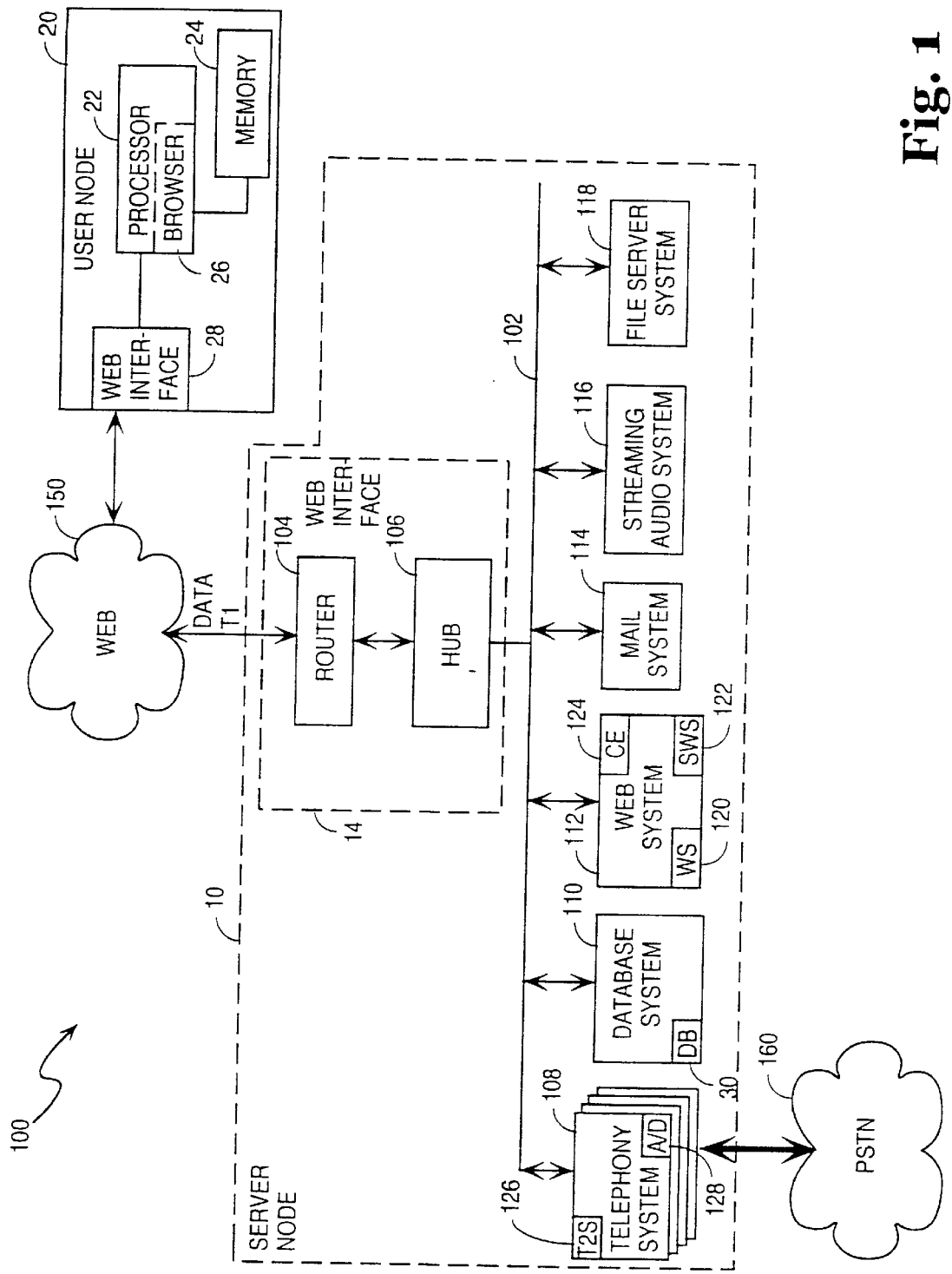
FIG. 1 is a block diagram of the system to implement one embodiment of the invention.

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, e-mail, facsimile, page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

PSTN: Public Service Telephone Network, e.g., AT&T, MCI, Sprint-owned telco

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

Thin Web Client: Any device that is capable of accessing the Internet.

General Description of an Embodiment

A method and apparatus to provide unified messaging between multiple media types over a network, such as the Internet, is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it should be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EFEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

FIG. 1 is a block diagram of the system to implement one embodiment of the invention. The server node 10, alternatively referred to as a point of presence (POP), is coupled through a predominantly digital/data network such as the worldwide web 150 and also through a predominantly analog/voice network, such as the public switch telephone network (PSTN) 160. The server node 10 includes a number of systems each of which may be instantiated as an autonomous computer coupled to a local area network (LAN) 102. The telephony system 108 is coupled between the PSTN 160 and the LAN 102. The telephony system 108 is responsible for incoming and outgoing calls for both voicemail and fax mail. The web system 112 and mail system 114 collectively provide web server and standard web based e-mail services over the web 150. Streaming audio system 116 includes an audio streamer. Database system 110 includes database 30 in which metadata corresponding to each user may be stored. File server system 118 may be used to store and, upon request, serve various messages to a user.

Web interface 14 includes a router 104 which is coupled to the web 150 through a data T1 connection. Router 104 is conventional and routes data traffic of web 150 through the data T1 connection in a conventional manner. Router 104 identifies data which is addressed for the server node 10 and passes such data to a hub 106 which is also conventional. The web interface also includes a domain name server (not shown) which translates domain names to specific network addresses in a conventional manner. A conventional firewall may also be provided as part of the web interface 14.

Web system 112 includes a web server 120, a secure web server 122, and a conversion engine 124. In one embodiment, conversion engine 124 provides text to speech conversion, bidirectional conversion between TIFF and GIF, and text to TIFF conversion. In one embodiment, the text to speech portion of the conversion engine resides in the telephony system as described below. In one embodiment, web server 120 and secure web server 122 are parts of Internet Information Server version 4.0 which is available from Microsoft Corporation of Redmond, Wash. Web server 122 serves requests for HTML documents according to the Hypertext Transport Protocol (HTTP) and secure web server 122 serves requests for HTML documents according to the Secure Hypertext Transport Protocol (HTTPS). A plurality of thin clients implement the user interface by which users interact with web system 112 through web 150. Thin clients are referred to as thin clients since they reside on web system 112 and not on remote computer systems used directly by users. Thin clients include HTML documents, CGI scripts, and data which collectively specify forms and graphical user interface constructs which, when displayed and processed by a conventional HTML browser, e.g., Microsoft's Internet Explorer or Netscape's Navigator, provide an interface by which a user can interact with web system 112. As a result, changes can be made to thin clients at the server node 10 and can be maintained easily without requiring any update of software installed on numerous remote user nodes 20 by which users can access messaging system 100. A typical user node includes a processor 22 operatively coupled to a memory 24 and a web interface 28. The processor executes a browser 26, such as those described above. In addition, avoiding a requirement of special software other than a conventional HTML browser, this allows users to access messages when away from home, e.g., by using a computer of a friend or a publicly available computer with a HTML browser such as computers frequently found at schools and public libraries. Effectively, this permits any device executing an HTML browser to be a user node.

One client implements a user interface by which a user can access voice, fax, and e-mail messages. The client implements standard features of commonly available full-featured e-mail clients including the ability to read e-mail messages, decode files attached to e-mail messages, create logical folders into which to place and organize stored e-mail messages, manage contact information including addresses, telephone numbers, and e-mail addresses, and configure e-mail message filters. The client also allows a user to use many of the information management mechanisms of full-featured e-mail clients to similarly organize voicemail messages and fax mail messages.

Web system 112 also includes an e-mail composer which is another thin clients. The e-mail composer includes HTML documents, forms, and CGI scripts which collectively implement, through a conventional HTML browser, a user interface by which a user can compose an e-mail message. For example, the user can specify one or more recipient e-mail addresses, one or more carbon-copy e-mail addresses, a textual subject, a textual body, one or more files to be attached, and a level of priority. In addition, all e-mail addresses can be specified by reference to address book entries for the user composing the message. Such address book entries are retrieved from database system 110 and displayed for the user by e-mail composer for selection using conventional graphical user interface techniques. When an e-mail message is completely composed, the user directs that the message be sent. E-mail composer converts the data specified by the user into the form of an e-mail message suitable for processing according to the simple mail transport protocol (SMTP). E-mail composer forwards the converted e-mail message to an outgoing mail server. The outgoing e-mail server forwards the e-mail message to mail system 114 which processes the message in a manner described more completely below.

While web system 112 processes access by a user through web 150, mail system 114 processes and routes e-mail messages within the server node 10. Mail system 114 receives outgoing mail from the web system 110 after creation in the e-mail composer, and also incoming mail from the web interface 14. E-mail messages can sometimes contain attachments which are infected with viruses which pose threats to the security and integrity of the recipient's computer system. Accordingly, outgoing mail and incoming mail are processed through a virus scanner in the mail system 114. The virus scanner (not shown) is conventional and is, in one embodiment, the WebShield virus scanner available from McAfee Associates of Santa Clara, Calif. Any detected viruses within an e-mail message are removed prior to allowing the e-mail message to continue.

After the scan, all e-mail messages are passed to a mail server. The mail server implements conventional e-mail transport protocols such as the Post Office Protocol for incoming e-mail and the Simple Mail Transport Protocol (SMTP) for outgoing e-mail. The mail server stores incoming e-mail messages in a dispatcher which forwards the e-mail messages to database system 110 for storage in the database.

The dispatcher also receives incoming e-mail messages from a remote e-mail collector. Remote e-mail collector retrieves e-mail messages from one or more email servers remote to the server node 10. For example, if a user has an e-mail account which is independent of messaging system 100 and which is sometimes referred to as the remote e-mail account, the user can provide data specifying the remote e-mail account and messaging system 100, in particular remote e-mail collector, periodically retrieves e-mail from the remote e-mail account from remote Post Office Protocol servers and includes such e-mail in all messages for the user as stored within database system 110. The mail server forwards outgoing e-mail messages through Internet 150 to external SMTP servers for distribution to target addresses.

Audio streaming system 116 includes a streaming audio server which receives streaming audio files, e.g., a voicemail message in real audio format, through LAN 102 from telephony system 108 and stores those files to be served responsive to a subsequent request. When a user directs that a voicemail message stored in such data files is to be played back through web 150, the streaming audio server retrieves the message from the streaming audio server and streams the message through web 150 to the user node 20 in a conventional manner. In one embodiment, streaming audio server is the Real Audio streaming audio server available from Real-Networks of Seattle, Wash.

Database system 110 serves requests for access to its database from web system 110, mail system 112, streaming/billing system 114, and telephony system 108 through LAN 102. Such requests comport with a structured query language (SQL) in this illustrative embodiment. For example, the database server can be the Microsoft SQL v6.5 SQL server available from Microsoft Corporation of Redmond, Wash.

Telephony system 108 includes telephony servers which process user access through PSTN 160. Each telephony server includes a number of telephone lines coupled to a telephone processing board, e.g., the Dialogic telephone processing board available from Dialogic Corporation of Parsippany, N.J. Incoming telephone lines receive telephone calls through PSTN 150. Users dialing in through PSTN 150 can leave a voice message or can issue commands in the form of voice commands by speaking or in the form of dual-tone, multiple frequency (DTMF) commands by pressing buttons on a touch tone telephone. The commands can direct telephony system 108 to perform a number of functions including without limitation (i) place an outside call, (ii) forward a stored fax mail message to a particular fax telephone number, (iii) page someone, and (iv) forwarding a voicemail message to a designated recipient.

The telephony servers place outside calls, e.g., calls to recipients outside messaging system 100, outgoing telephone lines to PSTN 160. Telephony system 108 includes outgoing fax servers which send previously stored fax mail messages to external fax telephone numbers through PSTN 160. Telephony system 108 may also include outgoing page servers which send page messages through PSTN 150 in generally the same conventional manner a person would, e.g. by dialing a pager access telephone number and providing a DTMF message to be displayed on the recipient's pager. Telephony system 108 includes outgoing voicemail servers which send previously stored voicemail messages by dialing a telephone number and playing the previously stored voicemail message. Thus, the message will be heard by a recipient or stored in the remote voicemail messaging system. In one embodiment, the system first identifies if the target phone number is on a compatible voicemail system, and if it is, it forwards the message directly into the voicemail box of the target system without dialing the number.

Telephony servers also include a text to speech converter 128 that converts, for example, e-mail text to speech as discussed further below. Additionally, when telephony system 108 receives an incoming analog voice call, it converts that call to one or more digital formats, e.g. VOX, wave, and audio streaming formats, and forwards those files across LAN 102 to file server system 118 and streaming audio system 116. Similarly, received faxes are forwarded to be stored in the file server system 118.

Details of one architecture suitable for implementing the invention can be found in the co-pending U.S. application entitled, Integrated Message Storage and Retrieval System Distributed over a Large Geographic Area, Ser. No. 09/239, 560.

Figure 2A:
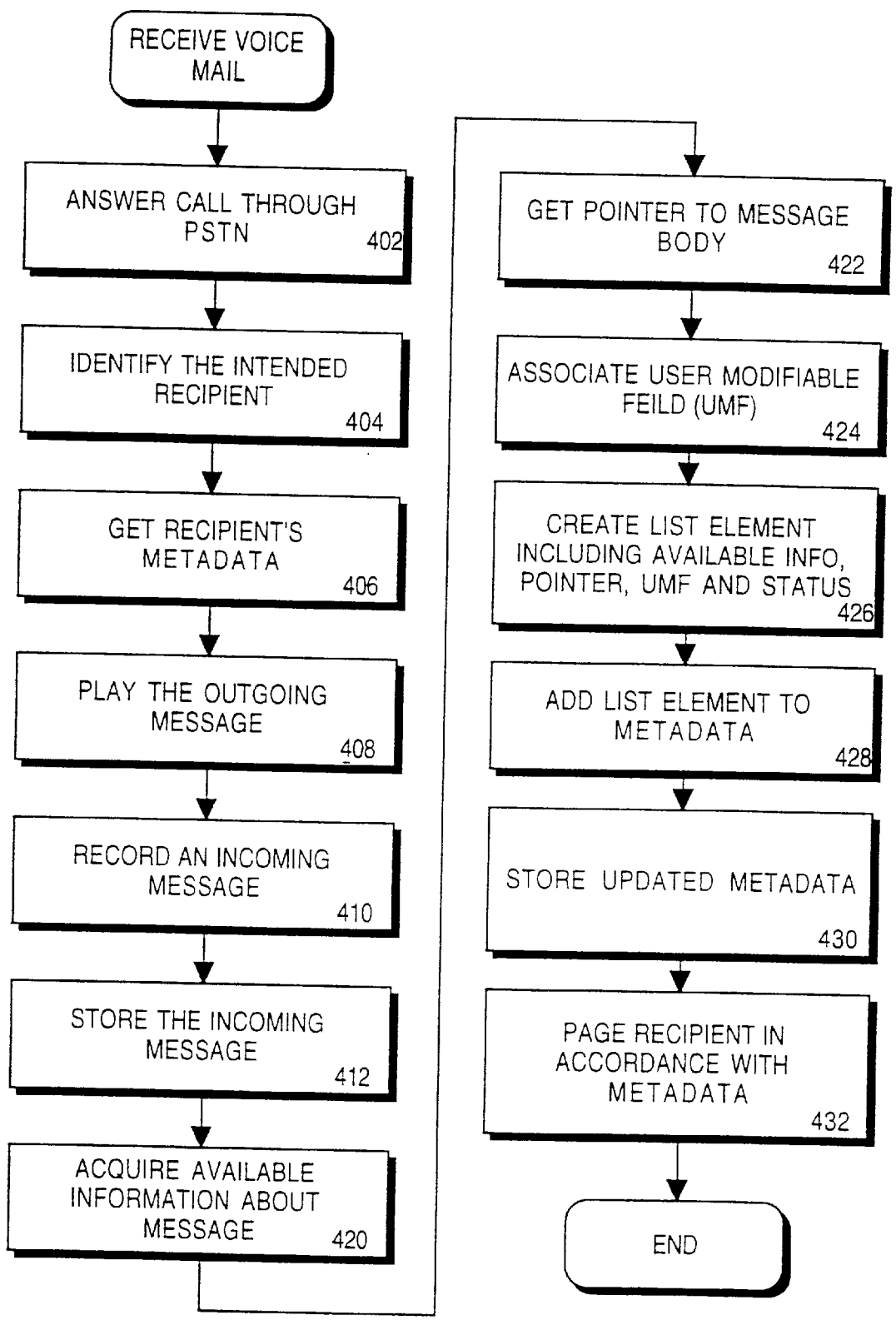
FIG. 2a is a logic flow diagram of the receipt and storage of voice messages by a messaging system.

FIG. 2a is a logic flow diagram of the receipt and storage of voice messages by messaging system 100. At functional block 402, the server node 10 answers a telephone call from PSTN 12 through the telephony interface 16. The server node 10 determines for which user the call is intended at functional block 404. The server node 10 makes such a determination by determining the telephone number which was dialed. In one illustrative embodiment, each user of messaging system 100 has two unique telephone numbers by which messaging system 100 is accessed. The first is referred to as a local access number and is a telephone number local to a physical location of the server node 10. The second is referred to as a toll-free access number and is a toll-free telephone number by which server node 10 may be reached. Since each telephone number is unique to one particular user, the telephone number dialed identifies the user whom the caller is attempting to reach. That user is referred to as the subject user in the context of FIGS. 2a and 2b. It is also within the scope and contemplation of the invention to have each user assigned only a single number or even to have multiple users assigned to one number with a differentiating extension prompted by the server node upon receipt of an incoming call.

At functional block 406, server node 10 retrieves metadata for the subject user from local database 202. Such metadata includes an outgoing message which is, in one illustrative example, an audio signal directing the caller to leave a voice message for the subject user. Server node 10 plays the outgoing message to the caller through PSTN 12 at functional block 408. At functional block 410, server node 10 records an audio message for the subject user as received through PSTN 12. Server node 10 stores the message digitally, e.g., as a digitized audio signal in the known, conventional VOX format, in database 30 at functional block 412. In addition, server node 10 updates the metadata 36 stored in the database 30 such that the received message is included in a list of new messages for the subject user. To accomplish this update, the server node 10 acquires information about the message at functional block 420. Such information may include time and date the message was received, the phone number of the sender either obtained through caller ID or because the voicemail gives the option for the sender to provide a return number, and a size of the message left. Within the context of a voicemail, size may be in time. At functional block 422, a pointer to the location of the message body in the database 36 is gotten. At functional block 424, a user modifiable field (UMF) is associated with the available information and the pointer to the message body. At functional block 426, the server node creates a message list element, including the available information, a pointer, the UMF, and a status of the message. "Status" as used herein refers to whether the message has been reviewed previously or not, thus, status might be "new" or "not new." The message list element is added to the metadata at functional block 428. At functional block 430, the updated metadata, including the message list element, is stored in the database 30. At functional block 432, the server node 10 via the telephony system 108 pages a target user, if appropriate, based on the user's metadata.

Figure 2B:
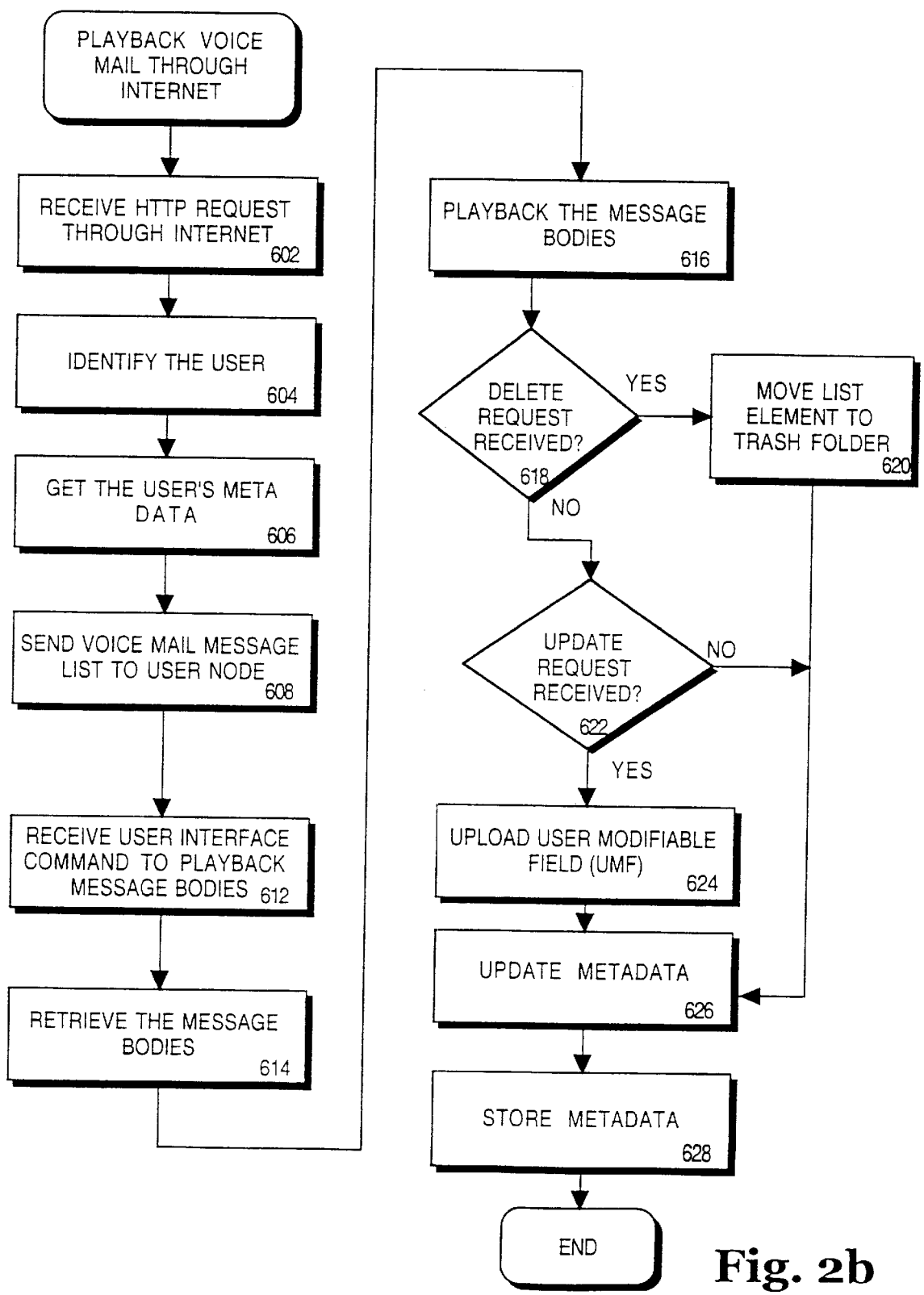
FIG. 2b is a logic flow diagram of retrieval of voicemail messages through a network in one embodiment of the invention.

FIG. 2b is a logic flow diagram of retrieval of voicemail messages through a network in one embodiment of the invention. At functional block 602, server node 10 receives an HTTP request for a base web page through web interface 18. Server node 10 displays a base web page which may include a form in which the user enters a username and an associated password. At functional block 604, server node 10 receives a username and associated password entered by the user at user node 20. The server node 10 uses the received username to identify the user.

At functional block 606, server node 10 retrieves metadata associated with the identified user from database 30. At functional block 608, the server node sends a template, including the voicemail message list extracted from the metadata to the user node for viewing.

One server node 10 receives user interface commands to playback one or more voicemail messages at functional block 612. In one illustrative embodiment, the user interface implemented by server node 10 includes a number of web pages which include forms which in turn execute CGI scripts to carry out specific commands entered by the user. In one embodiment, the user may request a message be played back by clicking on a corresponding list element in the displayed voicemail message list.

The requested message retrieved is completed at functional block 614. As described above, the message bodies are stored as digitized audio signals, e.g., in the known and conventional VOX format. Once the voice message bodies are retrieved, server node 10 plays the voicemail message bodies for the user through web 14 at functional block 618. For example, server node 10 may send the voicemail message bodies to audio streamer (not shown) which then streams the audio signal of each voicemail message through web 14 to the user node 20 which receives and plays the audio stream of the message body using known and conventional techniques for streamed audio in a computer system. Alternatively, the server node may convert the VOX file to a wave file and download the wave file to the user node 20. A user may then play the wave file on the user node using conventional techniques.

Once the message body has been played, a determination is made at decision block 618 whether the server node has received a delete request. If it has, the list element corresponding to the delete request is moved from the inbox folder to a trash folder at functional block 620. The delete request directed to a list element in the trash folder causes that list element to be expunged from the user's metadata entirely. At any time prior to expungement, the message can be moved out of the trash back into an active folder simply by opening the trash folder, selecting the message to be reactivated, and moving it to the desired folder.

If no delete request has been received, a determination is made at decision block 622 whether an update request has been received at the server node. Typically, a user will modify the user modifiable fields after listening to the message if the message is to be retained. The user modifiable field may then be used to identify the message and also as a sorting and searching aid from within the list of messages. Upon completing the desired modification of the user modifiable field or fields, the user can request the server node to make an update based thereon. If an update request is received at decision block 622, the server node uploads the user modifiable fields at functional block 624. At functional block 626, after the upload of the modifiable fields, or if no update request is received, or after the list element is moved to the trash in the event of a delete request, the server node updates the metadata to reflect the user's requested changes and any change in status of the messages remaining in the list. At functional block 628, the updated metadata is stored in the database 30.

As described above, voicemail messages may be received from a server node at a user node across a primarily data network. Additionally, the user modifiable fields permit the user to organize and manipulate the different voicemail messages in a manner or usually associated with e-mail messages or messages more commonly regarded as data messages or computer transmitted messages. This permits sorting and searching of messages for improved ease of use and allows low cost or no cost review of voicemail messages across great distances.

Figure 3A:
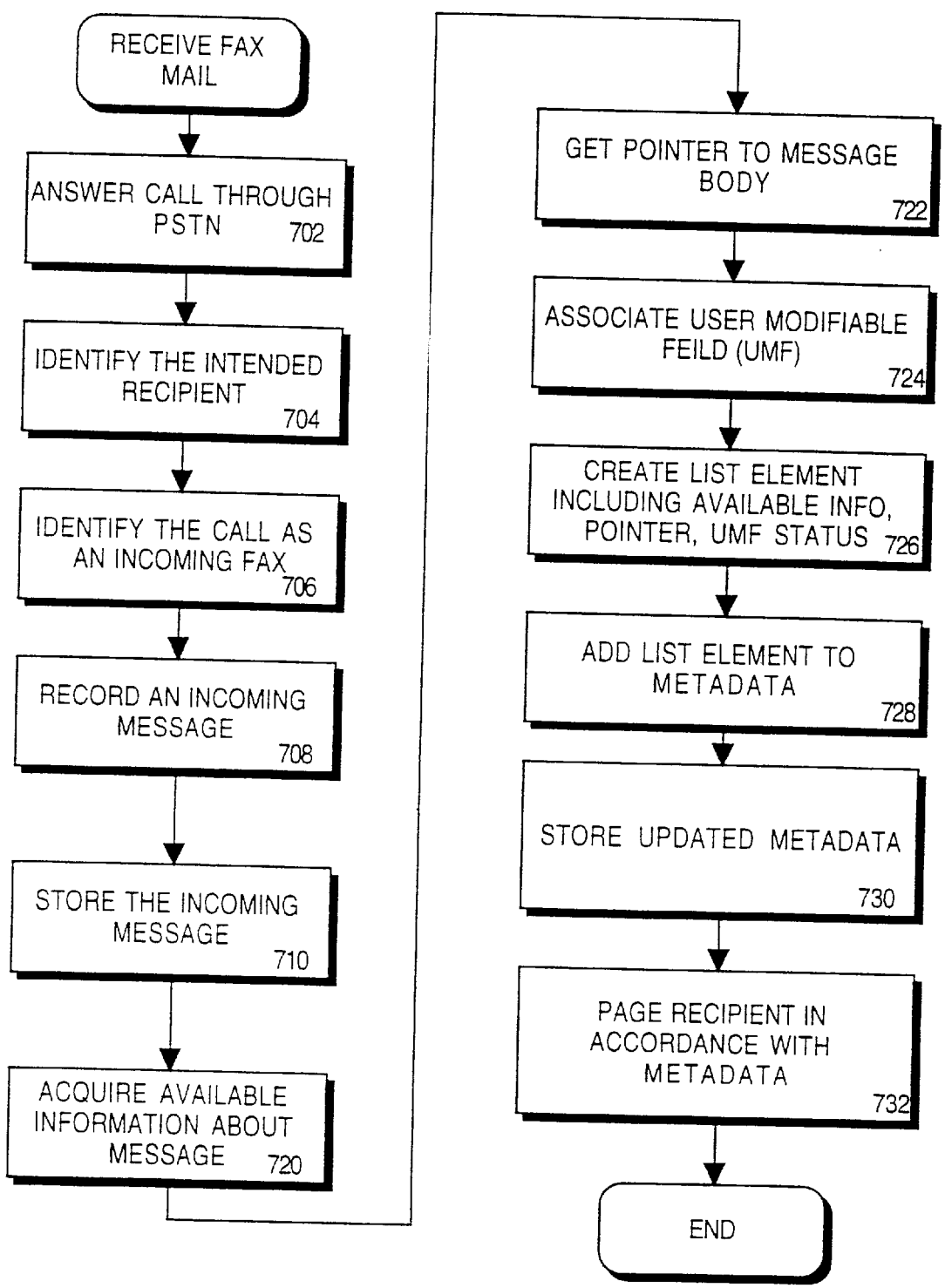
FIG. 3a is a flow diagram of fax receipt in one embodiment of the invention.

FIG. 3a is a flow diagram of fax receipt in one embodiment of the invention. At functional block 702, server node 10 answers a telephone call through PSTN 12. Server node 10 identifies the user for whom the call is intended by comparison of the telephone number by which the call reached the server node to access numbers of various users as represented in metadata stored in database 30, at functional block 704. The intended recipient of the fax is sometimes referred to as the subject user in the context of FIG. 3a. At functional block 706, server node 10 further identifies the call received through PSTN 12 as an incoming by recognizing distinctive tones generated by the transmitting facsimile machine to identify telephone calls as such.

At functional block 708, the server node receives the fax as would any conventional fax machine, e.g. according to standard fax transmission protocols. The server node stores the received fax in database 30 at functional block 710 as a fax mail message body. Typically, facsimiles are transmitted as TIFF and the message bodies are stored as TIFF. Server node 10 also updates the metadata 36 stored in the database 30 such that the received message is included in a list of new messages for the subject user. To accomplish this update, the server node 10 acquires information about the message at functional block 720. Such information may include time and date the message was received, the fax number of the sender, and a size of the message left, e.g. number of pages. At functional block 722, a pointer to the location of the message body in the database 36 is gotten. At functional block 724, a UMF is associated with the available information and the pointer to the message body. At functional block 726, the server node creates a message list element, including the available information, a pointer, the UMF, and a status of the message. The message list element is added to the metadata at functional block 728 and the metadata is stored in database 30 at functional block 730. At functional block 732, a target user is paged in accordance with the user's metadata. Accordingly, like the voicemail described above, in one embodiment, a fax mail message is received, either through the subject user's local access number or the subject user's toll-free access number, and is stored in database 30.

Figure 3B:
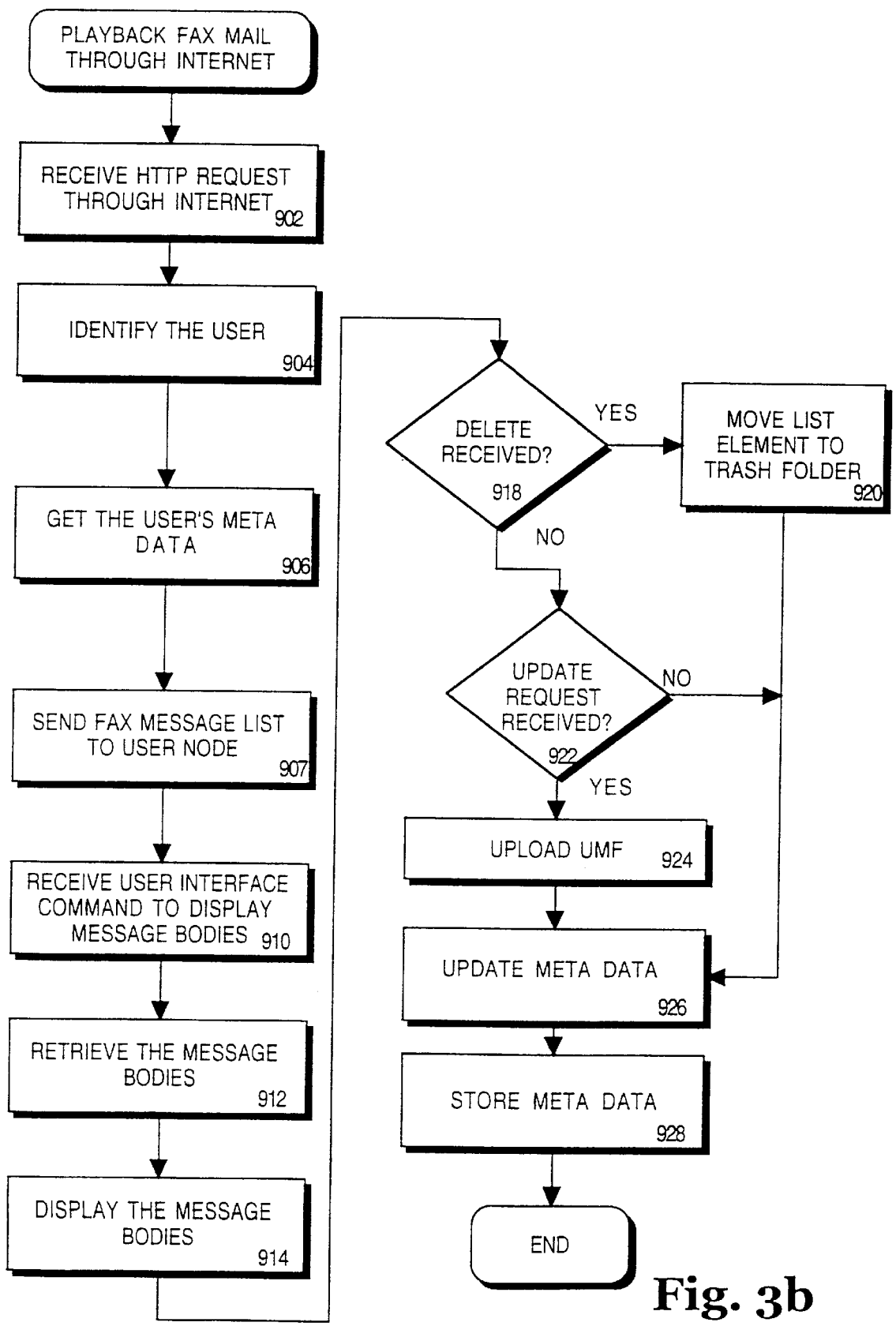
FIG. 3b is a logic flow diagram of retrieval of fax mail messages through a network in one embodiment of the invention.

FIG. 3b is a logic flow diagram of retrieval of fax mail messages through a network in one embodiment of the invention. Functional blocks 902–906 represent functions performed in the same manner as those described with reference to FIG. 2a at functional blocks 602–608. At functional block 912, server node 10 receives user commands directing display of one or more fax mail message bodies. At functional block 914, server node 10 retrieves those fax mail message bodies. Based on user selection, the server node either forwards the fax message body as TIFF or converts it on the server side to graphical image format (GIF) which can be displayed by nearly all personal computers and other likely user nodes without specialized software. This conversion may be done "on the fly" after the user requests the message body be sent. The server node 10 then sends the retrieved (and possibly converted) fax message body(ies) through web 14 for display on the user node 20. Thus, the user is able to view the substantive content of fax mail messages at the user node 20 without a fax machine, fax modem, or any specialized software.

Decision and functional blocks 918–928 are carried out in the same manner as analogous blocks 618–628 discussed above with reference to FIG. 2b. In this manner, fax mail messages may also be managed, sorted, searched, and otherwise manipulated over a data network similar to conventional e-mail.

Figure 4A:
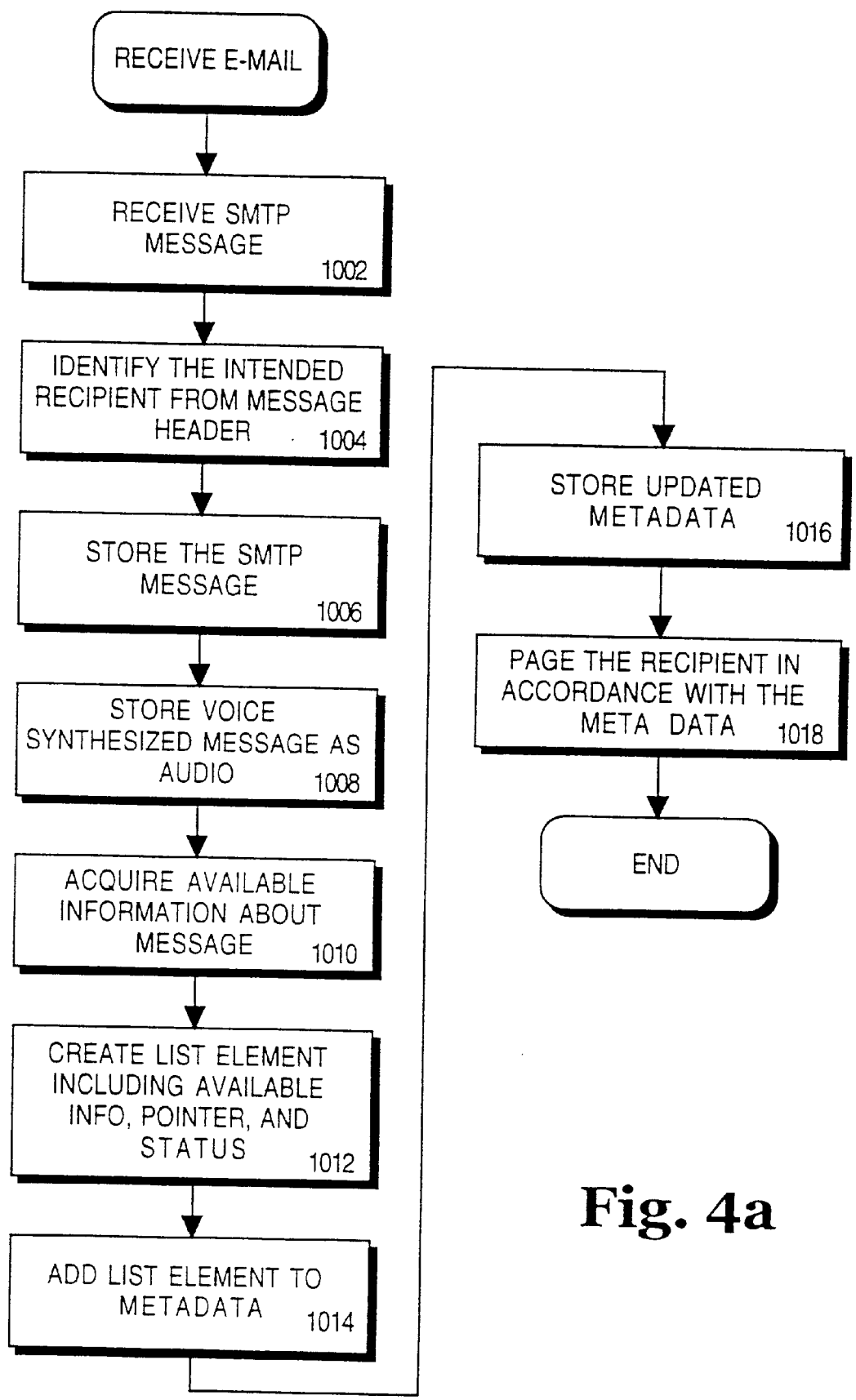
FIG. 4a is a logic flow diagram of e-mail receipt in one embodiment of the invention.

FIG. 4a is a logic flow diagram of e-mail receipt in one embodiment of the invention. At functional block 1002, the server node 10 receives an e-mail message through Internet 150. The e-mail message may comport with and be received according to the simple mail transfer protocol (SMTP). At functional block 1004, web system 112 identifies the target recipient of the e-mail message according to the e-mail address to which the message is directed. The web system 112 stores the e-mail SMTP message body in local database 30 at functional block 1006 and associates the e-mail message with the intended recipient within the database 30.

At functional block 1008, a voice synthesized audio version of the e-mail message is formed and stored in database 30. The audio version of the message facilitates forwarding of the e-mail message through PSTN as described more completely below. In one embodiment, the functional block 1008 is postponed until the audio version is requested, e.g., in response to identification of a voicemail address as a target address. At functional block 1010, the web system 112 requires information about the e-mail by, for example, passing the header. The information obtained may include data representing the sender of the e-mail message, the date and time of sending (or, alternatively, the receipt) of the message, the subject of the message as specified in the messages header, and the size of the message. A pointer to the message body (and possibly to the audio version) is obtained at functional block 1012. A list element is created at functional block 1014 containing the information from the pointer(s) and status of the message. At functional block 1014, the list element is added to the metadata. Then the metadata is stored in database 30 at functional block 1016. In addition, telephony system 108 pages the target recipient of the e-mail message in step 1012 if metadata stored in database 30 indicates that the intended recipient should be notified of newly arriving e-mail messages of the priority indicated.

Figure 4B:
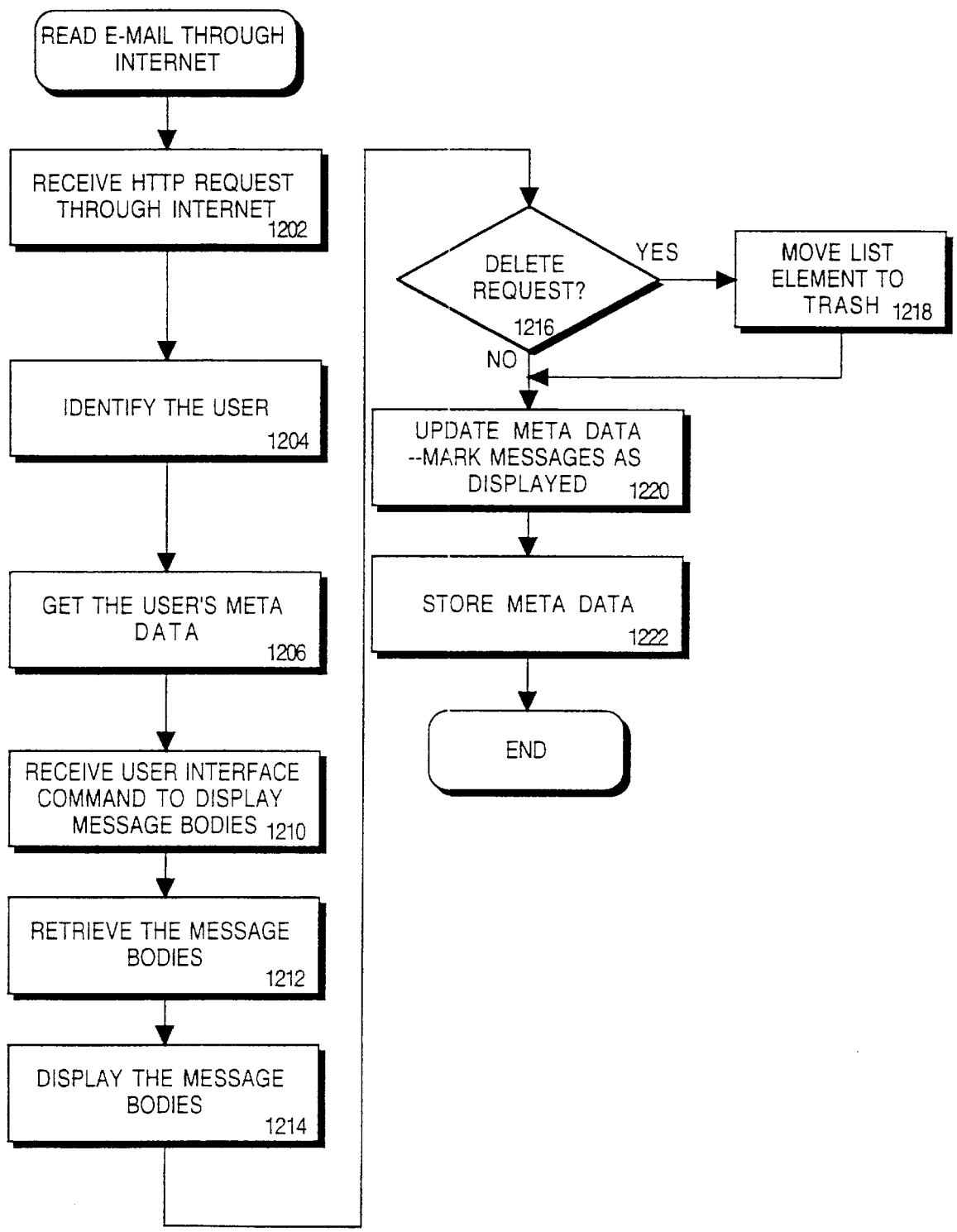
FIG. 4b is a logic flow diagram of e-mail retrieved across a network of one embodiment of the invention.

FIG. 4b is a logic flow diagram of e-mail retrieved across a network of one embodiment of the invention. At functional blocks 1202–1206, the redirect web server receives an HTTP request for a base web page, identifies the user, and redirects the user to web system 112 which retrieves the user's metadata from database 30 in the manner described above with respect to functional blocks 602–608. At functional block 1212, web system 112 receives user commands directing display of one or more e-mail message body(ies). At functional block 1214, web system 112 retrieves those e-mail message bodies from the database system 110. Web system 112 includes the e-mail message bodies as part of a web page for transmission through web 150. Display of the web page by the user through use of a conventional web browser displays the e-mail message bodies to the user at functional block 1216. Thus, the user is able to view e-mail messages stored in database 30 through web 150.

At decision block 1216, a determination is made if a delete request has been received. If it has, the corresponding e-mail list element is moved to an e-mail folder. Otherwise, at functional block 1220, web system 112 marks the retrieved e-mail messages as read within database 30 and further updates metadata for the user, e.g., to reflect a change in the number of unread e-mail messages. The web system 112 stores the updated metadata in database 30 at functional block 1222.

Figure 5A:
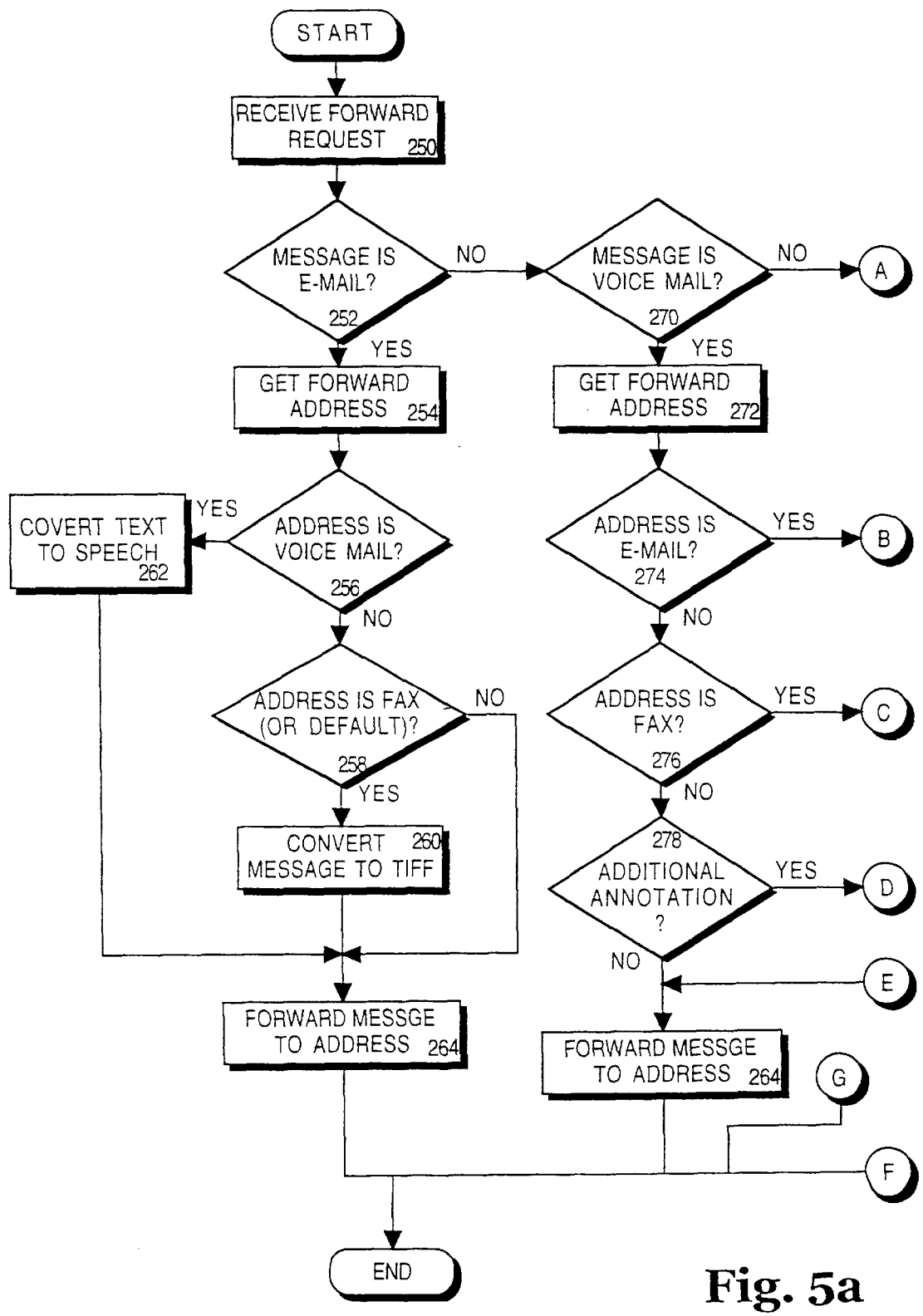
FIGS. 5a–c are a flow chart of forwarding an arbitrary media type in one embodiment of the invention.
Figure 5B:
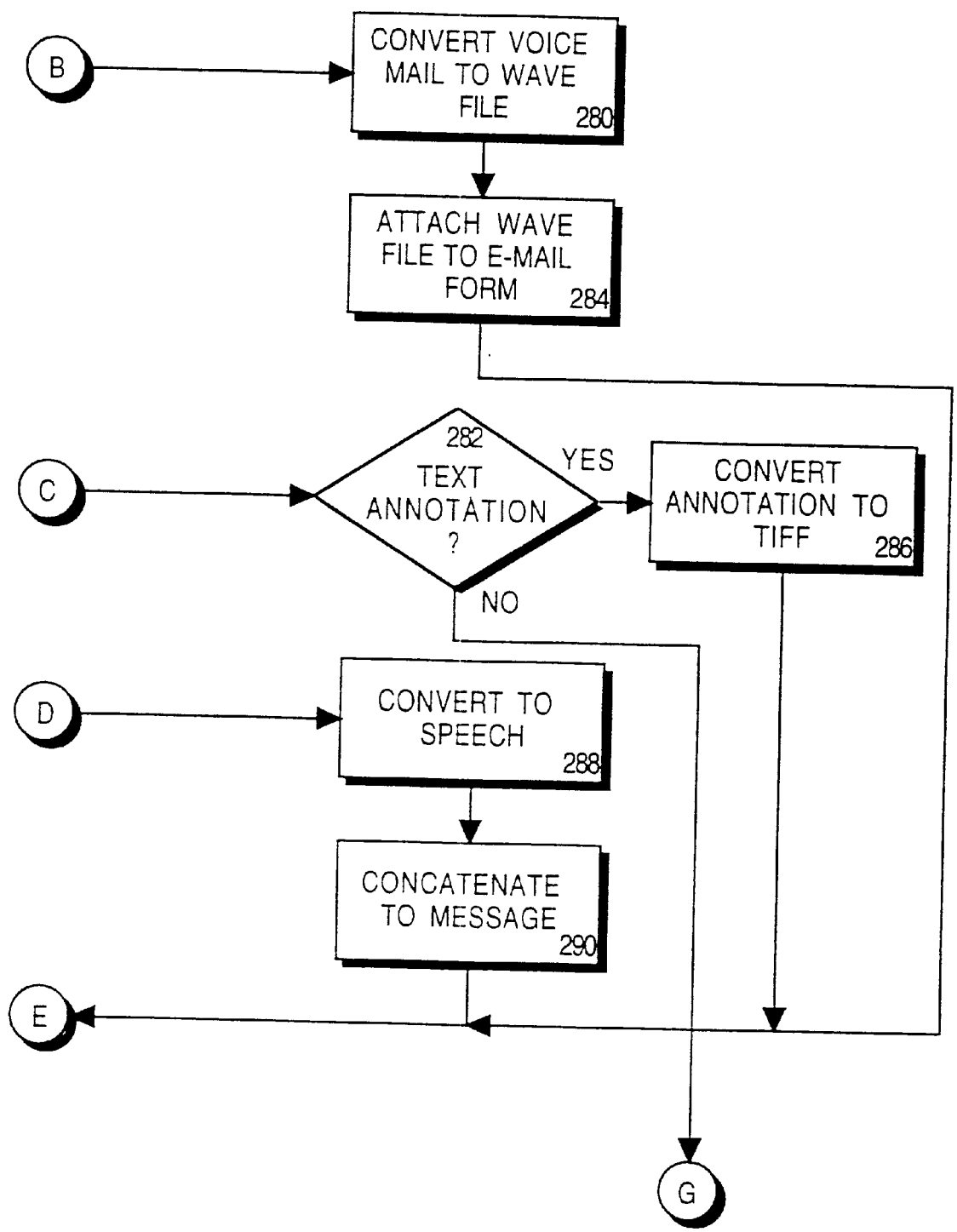
Figure 5C:
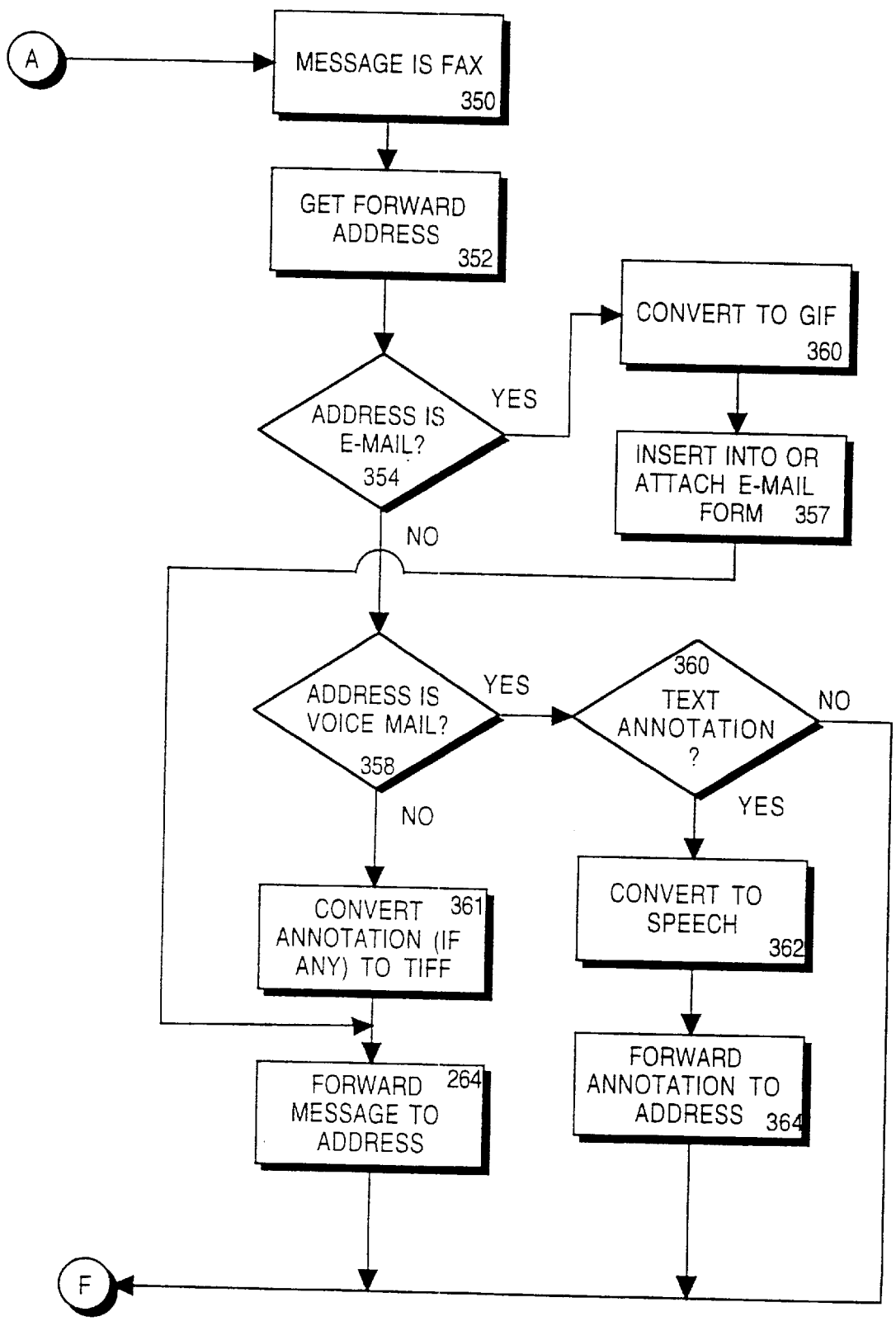

Once any message type is received and viewed (or for that matter, prior to being viewed), the system of one embodiment of the invention permits the message to be forwarded across parallity of available media types. FIGS. 5a–c are a flow chart of forwarding an arbitrary media type in one embodiment of the invention. At functional block 250, the server node 10 receives a forward request from the user node 20. A determination is made at decision block 252, whether the message to be forwarded is an e-mail. If the message is an e-mail, the server node 10 gets the forward address at functional block 254. A determination is made at decision block 256 if the forward address is a voicemail address. If the address is a voicemail address, the text of the e-mail is converted to speech and held as an audio file at functional block 262. Conversion of text to speech can be performed using well known speech synthesis technology. Any image data that is part of the e-mail message to be forwarded is not converted and will not forward as a voicemail. However, audio attachments to the e-mail will be concatenated with the converted text to speech.

If the address is not a voicemail address, a determination is made at decision block 258 if the address is a fax address. Additionally, if the address is a phone number with no designation as either fax or voicemail, default (where the message to be forwarded is an e-mail) is to a fax address. If the address is fax address or defaults to fax, the e-mail message is converted to tag image file format (TIFF) and the attachments in graphic image format (GIF) will similarly be converted to TIFF. Other printable attachments will also be converted to TIFF. This may be accomplished by sending such attachment to a standard fax driver that is commercially available. Any images already in TIFF will merely be concatenated with the converted portion of the message. Any audio attachments will be lost in the conversion. If the address is not a fax address at decision block 258 it is implicitly an e-mail address since only three message types are supported in this embodiment. If the forward address is an e-mail and the message is an e-mail, it is presumed to be in an appropriate format (e.g. SMTP) for forwarding. Once the message or portion of the message is in suitable form for the outgoing media type specified by the address, the message is forwarded to the address at functional block 264.

If at decision block 252, message is determined not to be an e-mail, the determination is made at decision block 270 whether the message is a voicemail. If the message is a voicemail, the server node 10 gets the forward address at functional block 272. A determination is then made at decision block 274 whether the address is an e-mail. If the address is an e-mail, the voicemail commonly stored in a VOX format is converted to a wave file at functional block 280. The wave file is then attached to an e-mail form at functional block 282. If the address is not an e-mail, a determination is made at decision block 276 if the address is a fax address, a determination is made at decision block 284 whether the user added any additional text annotation. If the user added additional text annotation to the voice file, that text annotation is converted to TIFF, if not, there is no message to forward to a fax address. If the address is not a fax address at decision block 276, it is a voicemail address by default. Accordingly, a determination is made at decision block 278 where a user has made additional annotations to the message to be forwarded. Any such text annotations will be converted to speech at functional block 288. The converted speech is then concatenated to the voicemail message at functional block 290. Again, once the voicemail message is in the proper form for forwarding out on the media type corresponding to the forward address, the message is forwarded to that address at functional block 264.

If at decision block 270, the message is determined not to be a voicemail, the message is a fax by default at functional block 350. At functional block 352, the server node gets the forward address a determination is then made at decision block 354 whether the address is an e-mail address. If it is, the fax is converted to a GIF at functional block 356, then at functional block 357, the GIF is inserted into or attached to an e-mail form. If the address is not an e-mail address at decision block 354, a determination is made at decision block 358 whether the address is a voicemail address. If it is, a determination is made at decision block 360, whether the fax includes any text annotations. If there are text annotations, those annotations are converted to speech at functional block 362. Then at functional block 364, the audio annotation is forwarded to the voicemail address. If there are no text annotations, no part of the fax message will be forwarded to the voicemail address. If at decision block 358 the address is not a voicemail address, the address is by default a fax address. Thus, any annotations are converted to TIFF at functional block 360 and concatenated with the fax. After functional block 357 or 366, the message is forwarded to the appropriate address.

It should be understood that a user may request that a particular message be forwarded to any or all of the media types such that for a particular message several branches of this flow diagram will be traversed. Additionally, it is within the scope and contemplation of the invention that the ordering of certain decisions and/or functional blocks may occur in parallel or in an order other than specified. This flow diagram is merely exemplary and other orderings are within the scope and contemplation of the invention. Moreover, while this flow chart presumes only three media types are supported it is envisioned that with minor modification, an arbitrary number of media types can be supported and such is within the scope and contemplation of the invention.

The ability to easily forward message types independent of the receipt medium allows great versatility. Moreover, the ability to forward faxes through the web without requiring a fax operator on the other side, allows a user to fax themself a fax at the message system 100, e.g. from a home office, and then forward it to themself at, e.g. a hotel, when they are traveling, thereby providing easy document access on the road.

Figure 6:
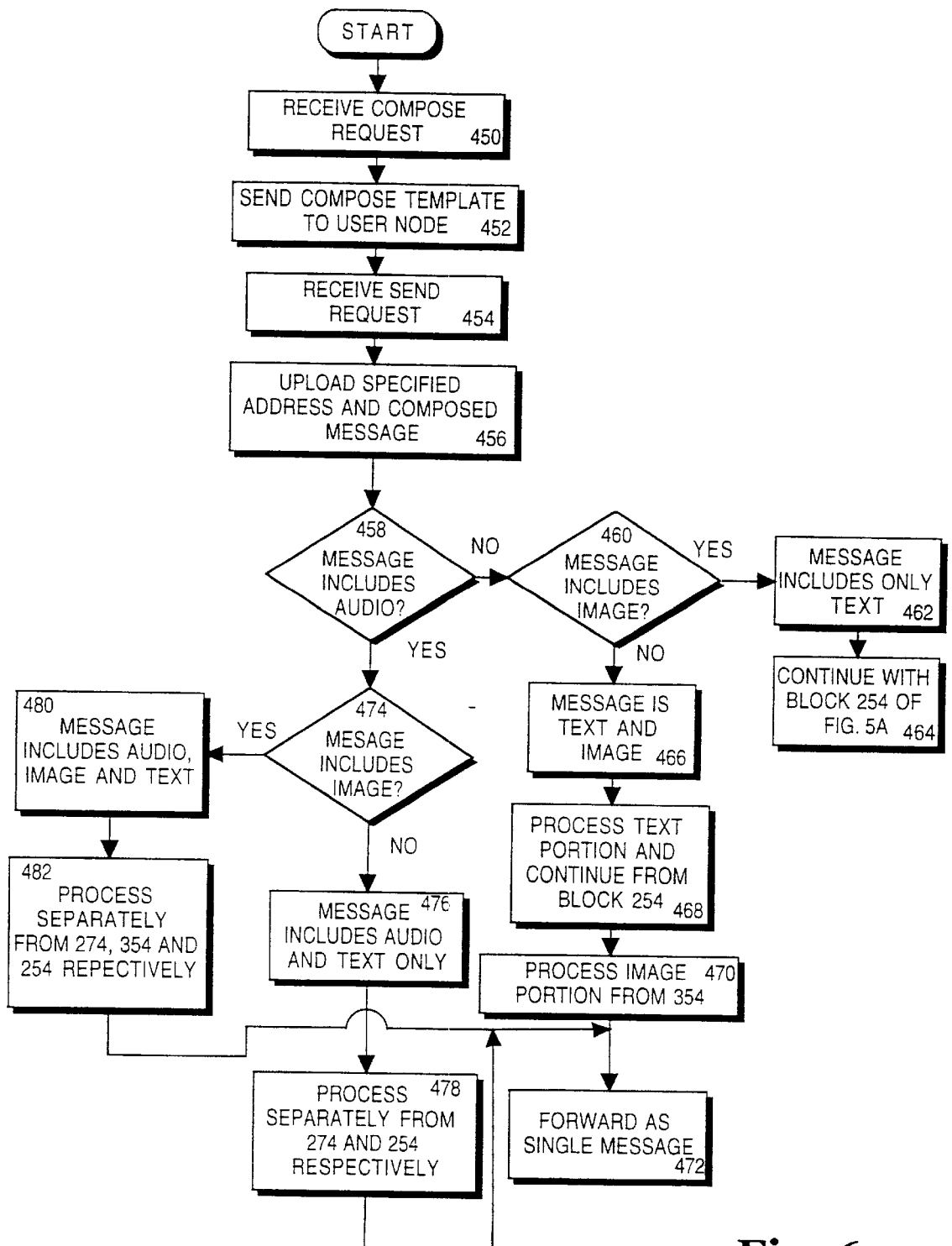
FIG. 6 is a flow diagram of sending an arbitrary a systems of one embodiment of the invention.

FIG. 6 is a flow diagram of sending an arbitrary a systems of one embodiment of the invention. The server node 10 receives a compose request from the user node 20 at functional block 450. The functional block 452 in response to the received request, the server node sends a compose template to the user node. Subsequently at functional block 454, the server node 10 receives a send request corresponding to the template previously sent to the user node. The server node 10 uploads the specified address to which the composed message is to be sent and the composed message at functional block 456. A composed message may include text and/or attachments which may be audio attachments or image attachments.

A determination is made at decision block 458 if the message includes audio. If the message includes no audio, a determination is made at decision block 460 if the message includes image data. If the message include no image data, the message is a text only message at functional block 462. Processing the text message continues as shown in FIG. 5a from block 254.

If at decision block 460, the message is determined to include image data, the message is both text and image data at functional block 466. Because the message is presumed entered in a compose template on the user node at a minimum the subject and address will be text. Thus, all messages composed using the compose template of one embodiment of the invention include some text data. At functional block 468, the text portion of the message is processed continuing from block 254 of FIG. 5a, while at functional block 470 the image portion of the message is processed continuing from block 354 of FIG. 5c. Ultimately, both portions of the message are recombined and sent as single message at functional block 472. The ultimate result will vary depending on the target (or forward) address. For example, if the target address is a voicemail, only the text will end up being forwarded to the voicemail as there is no image to a voicemail forwarding capability. Other possible combinations will be understood by those will ordinary skill in the art with reference to FIGS. 6 and 5a–c.

If at decision block 458, the message is determined to include audio, the determination is made at decision block 474 whether the message also includes image. If it does, the message includes audio image and text at functional block 480 respective components to the message will be processed separately in accordance with the flow of FIGS. 5a–c, beginning with 274, 354 and 254, respectively. Once that processing is complete, the message is forwarded as a single message at functional block 472. If at functional block 474 the message does not include image data, the message includes audio and text only at functional block 476, the audio and text components are processed separately from 274 and 254, respectively, from FIGS. 5a–c at functional block 478. Ultimately, the two components separately processed are recombined and forwarded as a single message at functional block 472.

The above describe forwarding and composition permit an arbitrary message to be sent to an arbitrary media type of the supported media. Analogously, a user may reply to any incoming message type via the web interface of the user node. The reply function is merely a hybrid of the forward and compose functions with the address specified by the message to which the reply is sent.

As discussed above, the server node 10 downloads various templates of a graphical user interface to perform the functionality of the integrated message system the server node provides. FIG. 7 is initial template downloaded to a user node from a server node once a user logs in. The template shows three icons corresponding to e-mail, fax mail and voicemail, as well as an indication next to each icon of the number of new messages of that type. Additionally, when new messages are present, the respective icon may show a different color than when no new messages are present. In FIG. 7, the user has two new e-mails and no new fax mail or voicemail. Accordingly, the e-mail icon may e.g., appear red while the fax and voicemail icons appear blue. Clicking on the icon signals the server node to download a corresponding message list. The message list will be discussed in further detail below with reference to other templates. A compose link, a folders link and addresses link are also provided. Clicking on the respective link signals the server node to download the compose template, the folder template, or the addresses template, respectively.

FIG. 8 is the compose template downloaded in response to a click on the compose link of the template of FIG. 7. A message may be composed in this template in the manner similar to common web based e-mail. A "to" field, a "subject" field, a "cc" field and a "bcc" field are all provided. Additionally, a text editing field exists in which to type the message body. However, unlike common e-mail systems, the address specified in the to, cc, and/or bcc fields need not merely be an e-mail address. Rather, addresses may be specified as e-mail, fax or voicemail, or for that matter any combination of the three, to distinguish between a fax mail number and a voicemail number, the additional designation ("fax") or ("voicemail") are used following the number. Commas are used to separate addresses, similar to traditional e-mail as possible to include attachments with the message. Such attachments may be text, audio or image. A soft button is provided to access the user's address book. Actuating the "address book" soft button signals the server node to send an address book template. Similarly, actuating the "send" soft button signals the server to upload the composed message to be sent to the specified addresses as described with reference to FIG. 6 above.

FIG. 9 is a folders template of one embodiment of the invention. The folders template shows the existing folders as well as the number of messages each contains. Voicemail and fax are in the shown embodiment limited to two folders, an in box folder and a trash folder. The user may create an arbitrarily large number of e-mail folders using the custom folder creation mechanism provided. It is also within the scope and contemplation of the invention that voicemail and fax may be provided with additional custom folder capability.

Figure 10:
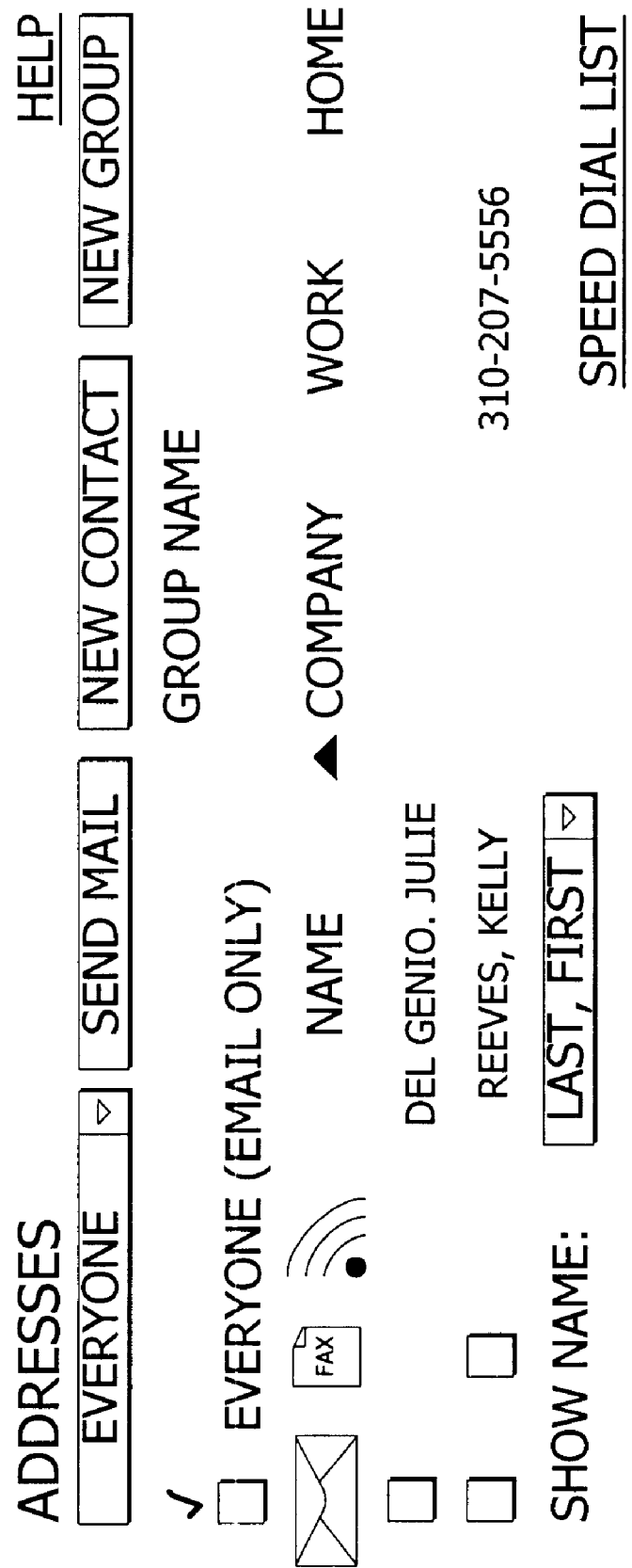
FIG. 10 is an addresses template of one embodiment of the invention.

FIG. 10 is an addresses template of one embodiment of the invention. The addresses template is downloaded responsive to clicking on the addresses link in the initial template of FIG. 7, or for example the address book soft button in the composed template of FIG. 8. In addition to name, company, work and home columns, three columns headed by the e-mail, fax, and voicemail icons appear at the beginning of the list. If when the specified individual was entered into the address book, a corresponding e-mail, fax or voicemail address is provided, a corresponding box will appear under the icon adjacent to the person's name. Clicking on the corresponding box will indicate that person to be a recipient of the message via the corresponding media type. It is possible to send, for example, one person the same message by all three media types. However, the portion of the message delivered on each medium will be constrained as explained with reference to FIGS. 5a–c and 6.

Figure 11:
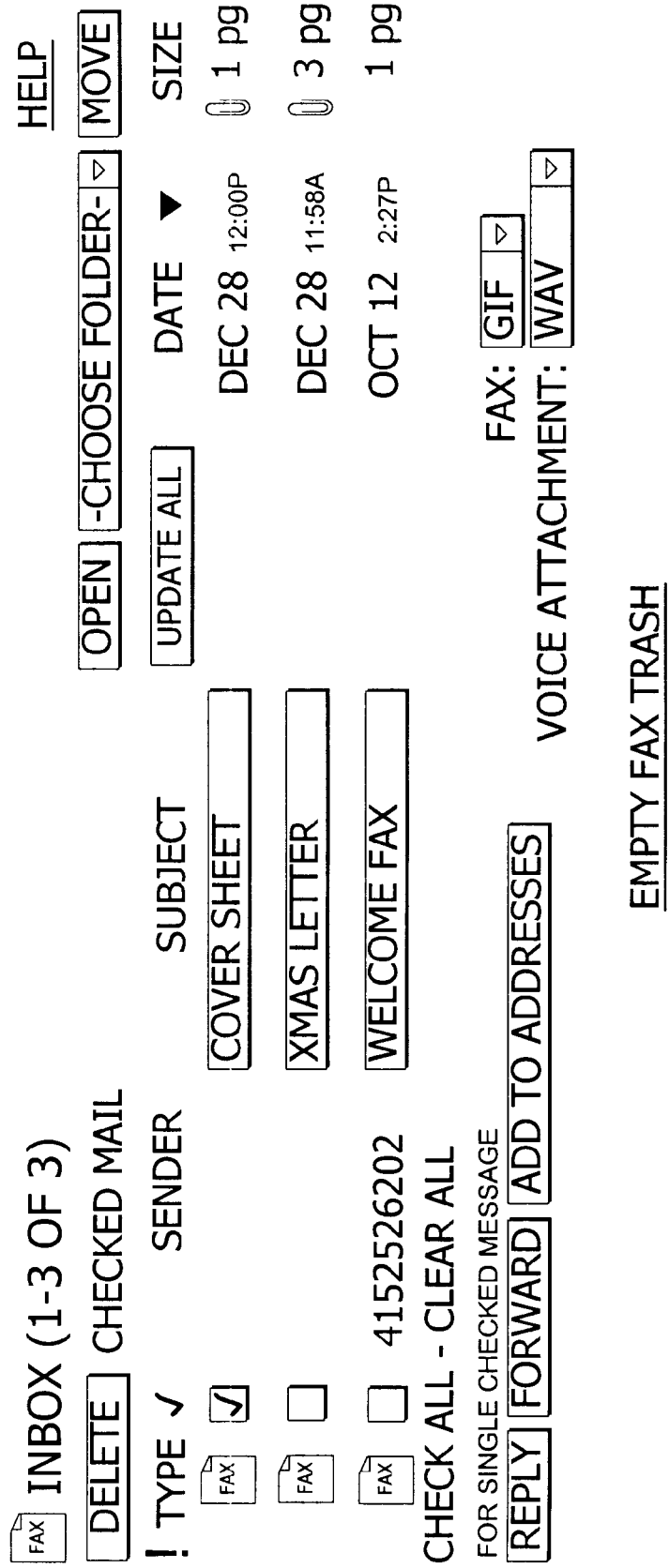
FIG. 11 is a template of a fax message list in one embodiment of the invention.

FIG. 11 shows a template for a fax message list in one embodiment of the invention. The list is broken down into columns, including priority (signified by an "!"), type, selection ("signified by a "√"), sender, subject, date, and size. The subject in this embodiment is the UMF. Typically, voicemails in the prior art do not have subjects because the message is the subject. Once the subject field is modified, the list can be sorted on the subject field, or a search can be conducted for a particular subject field's content. The user merely clicks on the "subject" column heading. This causes an event to be sent to the server node in response to which the server returns the list sorted on the "subject" column. A format menu is provided in which a user can select from a plurality of formats for downloading a message body. In one embodiment, the fax may be downloaded as either a TIFF or a GIF. A download option menu is provided by both templates.

Actuating the reply or forward soft button with a check in one box in the selection columns signals the server node to download the composed template with the address already inserted for the corresponding media type to which the reply is being sent. In the case of the forward soft key, the checked message would be automatically attached. Forwarding is described above with reference to FIGS. 5a–c.

FIG. 12 is a compose template responsive to actuation of the forward button in FIG. 11. The fax called "cover sheet" in FIG. 11 is pre-attached. By entering addresses in the To field (both an e-mail address and a phone number with no designation are present) and a voicemail address in the cc field, a message will be sent to each of an e-mail, a fax and a voicemail. The undesignated telephone number defaults to fax since the forwarded attachment is a fax. Conversely, if the forwarded attachment were a voicemail, the forward would go twice to voicemail (because the default address would be voicemail) and once to e-mail since the system default to the forwarded message type where ambiguity exists. Responsive to the actuation of the "send" soft button, the server node sends the message to the specified addresses. FIG. 13 is a confirmation template returned by the server node to indicate that the message has been successfully sent.

FIG. 14 is an e-mail listing reflecting the receipt of the forwarded mail and also the fax confirmation. E-mail can be manipulated in the manner common to web-based e-mail, including foldering. FIG. 15 is the fax confirmation e-mail opened.

FIG. 16 shows the fax list template with the addition of the forwarded fax. Notably, when it arrives, the subject field is blank. Additionally, because the message is new, the date and size appear in bold type and the icon is a different color from the other icons in the type column corresponding to read messages. FIG. 17 shows the same fax listing sorted alphabetically by subject with the subject field modified to reflect the subject of the previously forwarded fax.

Figure 18:
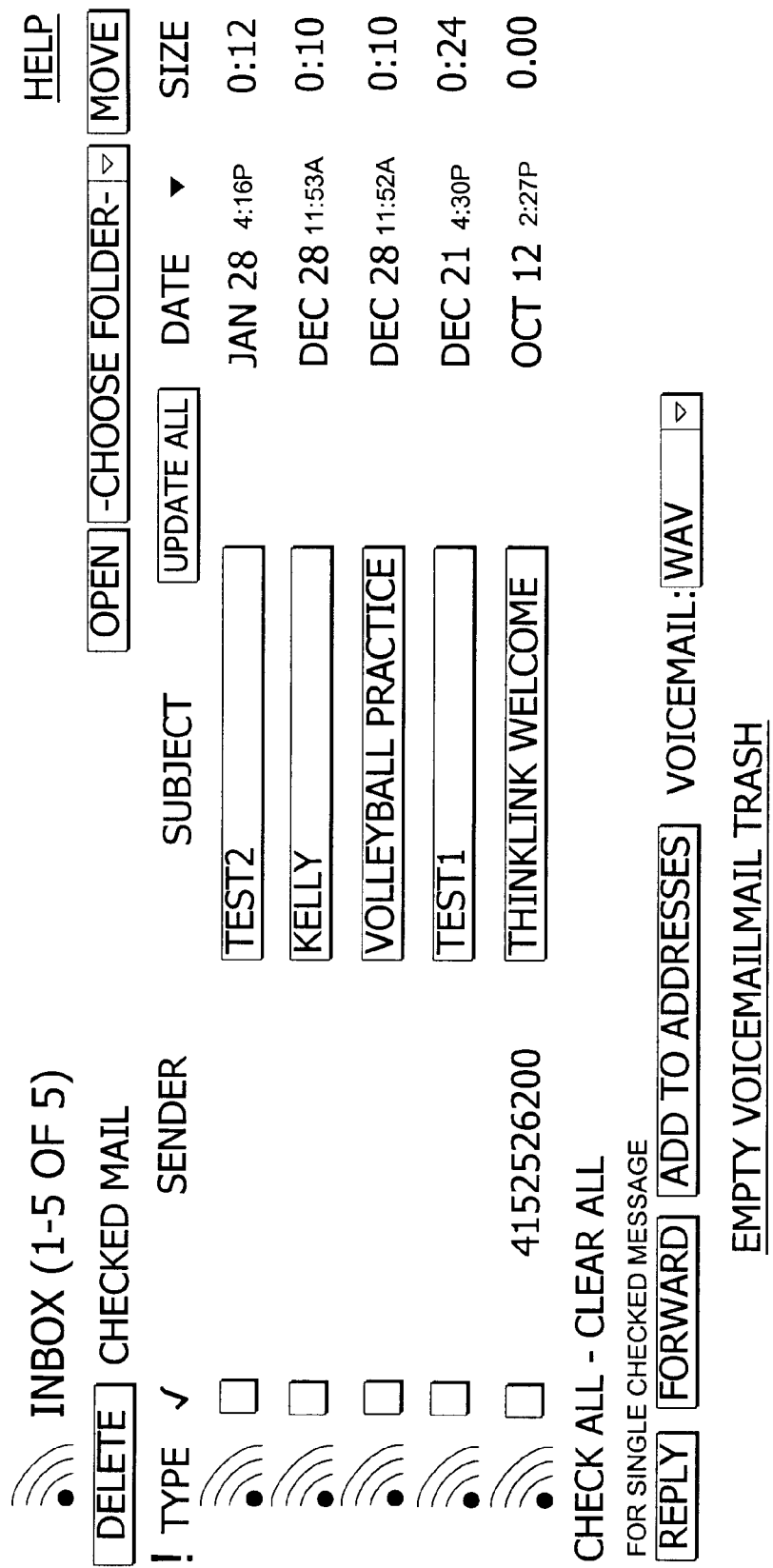
FIG. 18 is a template of a voicemail message list of one embodiment of the invention.

FIG. 18 is a template of a voicemail message list of one embodiment of the invention. The voicemail message list is substantially the same as the fax mail message list, except that the forwarding options, rather than being TIFF and GIF are either wave file or audio streaming. Notably, the Test2 voicemail is reflected in this list and contains a voice synthesis of the text of the forwarded fax message, but not any of the image data reflected by the attachment.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:

a web interface;

a telephony interface; and a server node able to receive e-mails via the web interface, and facsimiles and voicemails via the telephony interface, the server node providing access to a message arriving on any of these media and ability to respond on any of these media from a user node executing a thin web browser;

wherein the server node includes a conversion engine to convert a first message received on a first medium to a second message forwardable on a second medium; and wherein the conversion engine comprises: a text to speech application; a text to Tagged Image File Format ("TIFF") application; and a TIFF to Graphic Interchange Format ("GIF") application.

2. The system of claim 1 wherein the server node provides alternative user selectable delivery formats for at least one message type.

3. The system of claim 2 wherein the server node further comprises:

an audio streamer and wherein a voicemail may be downloaded to the user node as a wave file or streamed to the user node.

4. The system of claim 2 wherein a facsimile may be downloaded to the user node in either TIFF format or GIF format.

5. The system of claim 2 wherein the server node retains a set of preferences associated with a user.

6. A method comprising:

receiving a request over a network from a user node to send a facsimile to an e-mail address;

converting the facsimile into a Graphic Interchange Format ("GIF") format; and inserting the GIF into an e-mail form.

7. A computer-readable medium having computer-executable instructions for performing the method recited in claim 6.

8. A method comprising:

receiving a request over a network from a user node to send a first message having an e-mail message type to a target address that is a phone number;

determining if the phone number is a voicemail address or a facsimile address;

defaulting to the facsimile address if the determination is unsuccessful; and converting, on a server side, the first message to a second message compatible with the target address.

9. The method of claim 8 wherein the phone number is a facsimile address, further comprising:

converting the e-mail to Tagged Image File Format ("TIFF"); and converting any text attachment to TIFF.

10. The method of claim 8 wherein the phone number is a voicemail address, further comprising:

converting the e-mail text to speech; and saving the converted text in an audio format.

11. A computer-readable medium having computer-executable instructions for performing the method recited in claim 8.

12. A computer-readable medium having computer-executable instructions for performing the method recited in claim 9.

13. A computer-readable medium having computer-executable instructions for performing the method recited in claim 10.

14. A method comprising:

receiving a request over a network from a user node to send a first message having a first message type to a voicemail address;

converting, on a server side, the first message into a second message, the second message being voicemail compatible, if the first message type is not voicemail compatible;

placing a physical call to the voicemail address; and playing one of the first message and the second message responsive to an answer of the voicemail address.

15. A method comprising:

receiving a request over a network from a user node to send a first message having a first message type to a voicemail address;

converting, on a server side, the first message into a second message, the second message being voicemail compatible, when the first message type is not voicemail compatible;

discerning if a gateway exists between a local voicemail system and a forward voicemail system; and directly inserting one of the first message and the second message into an inbox on the forward voicemail system if the gateway exists.

* * * * *